United States Patent
You et al.

(10) Patent No.: US 12,408,149 B2
(45) Date of Patent: Sep. 2, 2025

(54) OPERATING METHOD FOR IAB NODE IN WIRELESS COMMUNICATION SYSTEM, AND APPARATUS USING SAME

(71) Applicant: LG ELECTRONICS INC., Seoul (KR)

(72) Inventors: Hyangsun You, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/799,129

(22) PCT Filed: Feb. 10, 2021

(86) PCT No.: PCT/KR2021/001786
§ 371 (c)(1),
(2) Date: Aug. 11, 2022

(87) PCT Pub. No.: WO2021/162452
PCT Pub. Date: Aug. 19, 2021

(65) Prior Publication Data
US 2023/0164747 A1    May 25, 2023

(30) Foreign Application Priority Data
Feb. 12, 2020    (KR) .................. 10-2020-0017115

(51) Int. Cl.
*H04W 72/04* (2023.01)
*H04L 5/00* (2006.01)
*H04W 74/0833* (2024.01)

(52) U.S. Cl.
CPC ........... *H04W 72/04* (2013.01); *H04L 5/0048* (2013.01); *H04W 74/0833* (2013.01)

(58) Field of Classification Search
CPC ............. H04W 72/04; H04W 74/0833; H04W 84/047; H04W 88/04; H04W 72/23;
(Continued)

(56) References Cited

U.S. PATENT DOCUMENTS

2019/0313433 A1    10/2019    Abedini et al.
2022/0225333 A1*    7/2022    Liu ................... H04W 72/23
(Continued)

FOREIGN PATENT DOCUMENTS

WO    2019/194737 A1    10/2019

OTHER PUBLICATIONS

Ericsson, "IAB resource configuration and assignment", 3GPP TSG-RAN WG1 Meeting #96, Athens, Greece, Mar. 1-25, 2019, R1-1902412; Retrieved from the Internet: URL:http://www.3gpp.org/ftp/tsg%5Fran/WG1%5FRL1/TSGR1%5F96/Docs/R1%2D1902412°/02Ezip [retrieved on Feb. 15, 2019].
(Continued)

*Primary Examiner* — Syed Ali
*Assistant Examiner* — Najeeb Ansari
(74) *Attorney, Agent, or Firm* — BRYAN CAVE LEIGHTON PAISNER LLP

(57) ABSTRACT

Provided are a method of operating an integrated access and backhaul (IAB) node including a mobile terminal (MT) and a distributed unit (DU) in a wireless communication system, and an apparatus using the method. The method identifies a specific resource supporting the simultaneous operation of the MT and the DU, and according to a type of a first signal that the MT intends to communicate in the specific resource and a type of a second signal that the DU intends to communicate in the specific resource, a multiplexing type to be applied to the specific resource is determined.

3 Claims, 40 Drawing Sheets

(58) Field of Classification Search
CPC ......... H04W 72/0446; H04W 72/0453; H04W 72/535; H04L 5/0048; H04L 5/001; H04L 5/14

See application file for complete search history.

(56) References Cited

U.S. PATENT DOCUMENTS

| | | | | |
|---|---|---|---|---|
| 2022/0278741 A1* | 9/2022 | Dahlman | ............ | H04B 7/15542 |
| 2023/0345553 A1* | 10/2023 | Maya | ................. | H04B 7/15542 |
| 2024/0056891 A1* | 2/2024 | Huang | .............. | H04W 72/0446 |

OTHER PUBLICATIONS

Ericsson, "Remaining issues on IAB resource configuration and multiplexing", 3GPP TSG RAN WG1 Meeting #98bis, Chongqing, China, Oct. 14-20, 2019, R1-1912133; Retrieved from the Internet: URL:https://ftp.3gpp.org/tsg_ran/WG1_RL1/TSGR1_99/Docs/R1-1912133.zip R1-1912133.docx [retrieved on Nov. 8, 2019].

R1-1812201, (Nov. 3, 2018), 3GPP TSG RAN WG1 Meeting #95, Spokane, USA, Nov. 12-16, 2018, Agenda Item: 7.2.3.3, Source: Huawei, HiSilicon, Title: On resource coordination and dynamic scheduling in IAB, Document for: Discussion and Decision (7 pages).

R1-1911166, (Oct. 4, 2019), 3GPP TSG RAN WG1 #98bis, Chongqing, China, Oct. 14-18, 2019, Source: NTT Docomo, Inc., Title: Mechanisms for resource multiplexing among backhaul and access links, Agenda Item: 7.2.3.2, Document for: Discussion and Decision (12 pages).

R1-1912133, (Nov. 8, 2019), GPP TSG-RAN WG1 Meeting #99, Reno, U.S., Nov. 18-22, 2019, Agenda Item: 7.2.3.1, Source: Ericsson, Title: Remaining issues on IAB resource configuration and multiplexing, Document for: Discussion (7 pages).

Nokia, Nokia Shanghai Bell, "Mechanisms for resource multiplexing among backhaul and access links", 3GPP TSG-RAN WG1 Meeting #98bis, Chongqing, China, Oct. 14-20, 2019, R1-1911194.

* cited by examiner

OPERATING METHOD FOR IAB NODE IN WIRELESS COMMUNICATION SYSTEM, AND APPARATUS USING SAME

CROSS-REFERENCE TO RELATED APPLICATIONS

This application is the National Stage Filing under 35 U.S.C. 371 of International Application No. PCT/KR2021/001786, filed on Feb. 10, 2021, which claims the benefit of Korean Application No. 10-2020-0017115, filed on Feb. 12, 2020, the contents of which are all hereby incorporated by reference herein in their entirety.

BACKGROUND OF THE DISCLOSURE

Field of the Disclosure

The present disclosure relates to a method of operating an integrated access and backhaul (IAB) node including a distributed unit (DU) and a mobile terminal (MT) in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In NR, massive MIMO or multi-beam may be used, and a very large bandwidth is expected to be available compared to LTE, and the development and deployment of integrated access and backhaul (IAB) nodes is also expected.

An IAB node may be a node that supports a wireless connection with a terminal/other node like a repeater based on a wireless backhaul (connection with a parent node or a donor node) supporting multi-hop. The IAB node may include a distributed unit (DU) and a mobile terminal (MT). Here, the DU may be a part that provides a connection to a terminal or other node, and the MT may be a part that provides a connection to a parent node or a donor node.

Meanwhile, in the discussion of the conventional IAB node, it is assumed that the DU and the MT operate at different times. That is, on the premise of time division multiplexing (TDM) in which only one of DU and MT operates at a specific time, resource allocation for DU and MT has been discussed. In other words, the conventional IAB node performed only the TDM operation.

On the other hand, in the future system, a no-TDM operation in which the DU and the MT of the IAB node operate simultaneously is also considered. There is a need to clearly define how IAB nodes will operate in these future systems.

SUMMARY OF THE DISCLOSURE

An object of the present disclosure is to provide a method of operating an IAB node including a DU and an MT in a wireless communication system, and an apparatus using the method.

In one aspect, provided is a method of operating an IAB node including a DU and a MT in a wireless communication system. The method includes receiving first configuration information for configuring a resource for an operation of the MT, receiving second configuration information for configuring a resource for an operation of the DU and identifying a specific resource supporting simultaneous operation of the MT and the DU based on the first configuration information and the second configuration information. According to a type of a first signal that the MT intends to communicate in the specific resource and a type of a second signal that the DU intends to communicate in the specific resource, a multiplexing type to be applied to the specific resource is determined.

In another aspect, provided is an IAB node including a DU and a MT. The IAB node includes a transceiver, at least one memory and at least one processor operatively coupled with the at least one memory and the transceiver. The processor is configured to: receive first configuration information for configuring a resource for an operation of the MT, receive second configuration information for configuring a resource for an operation of the DU and identify a specific resource supporting simultaneous operation of the MT and the DU based on the first configuration information and the second configuration information. According to a type of a first signal that the MT intends to communicate in the specific resource and a type of a second signal that the DU intends to communicate in the specific resource, a multiplexing type to be applied to the specific resource is determined.

In still another aspect, provided is an apparatus of an IAB node including a DU and a MT. The apparatus includes at least one memory and at least one processor operatively coupled with the at least one memory. The processor is configured to: receive first configuration information for configuring a resource for an operation of the MT, receive second configuration information for configuring a resource for an operation of the DU and identify a specific resource supporting simultaneous operation of the MT and the DU based on the first configuration information and the second configuration information. According to a type of a first signal that the MT intends to communicate in the specific resource and a type of a second signal that the DU intends to communicate in the specific resource, a multiplexing type to be applied to the specific resource is determined.

In still another aspect, provided is at least one computer readable medium (CRM) having an instruction to be executed by at least one processor to perform operations includes: receiving first configuration information for configuring a resource for an operation of the MT, receiving second configuration information for configuring a resource for an operation of the DU and identifying a specific resource supporting simultaneous operation of the MT and the DU based on the first configuration information and the second configuration information. According to a type of a first signal that the MT intends to communicate in the specific resource and a type of a second signal that the DU intends to communicate in the specific resource, a multiplexing type to be applied to the specific resource is determined.

In still another aspect, provided is a method for a parent node to communicate with an IAB node including a DU and a MT in a wireless communication system. The method includes transmitting, to the IAB node, first configuration information for configuring a resource for an operation of the MT, transmitting, to the IAB node, second configuration information for configuring a resource for an operation of the DU and communicating with the IAB node in a specific resource supporting simultaneous operation of the MT and the DU based on the first configuration information and the second configuration information. A multiplexing type applied to the specific resource is determined according to a type of a first signal that the MT intends to communicate in the specific resource and a type of a second signal that the DU intends to communicate in the specific resource.

In still another aspect, provided is a parent node. The parent node includes a transceiver, at least one memory and a processor operatively coupled with the transceiver and the at least one memory. The processor is configured to: transmit, to the IAB node, first configuration information for configuring a resource for an operation of the MT, transmit, to the IAB node, second configuration information for configuring a resource for an operation of the DU and communicate with the IAB node in a specific resource supporting simultaneous operation of the MT and the DU based on the first configuration information and the second configuration information. A multiplexing type applied to the specific resource is determined according to a type of a first signal that the MT intends to communicate in the specific resource and a type of a second signal that the DU intends to communicate in the specific resource.

Even if a resource for which simultaneous operation between the DU and the MT is configured or supported, when a specific condition is satisfied, problems such as power sharing and interference between the MT and the DU may be reduced by operating the TDM on the resource.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
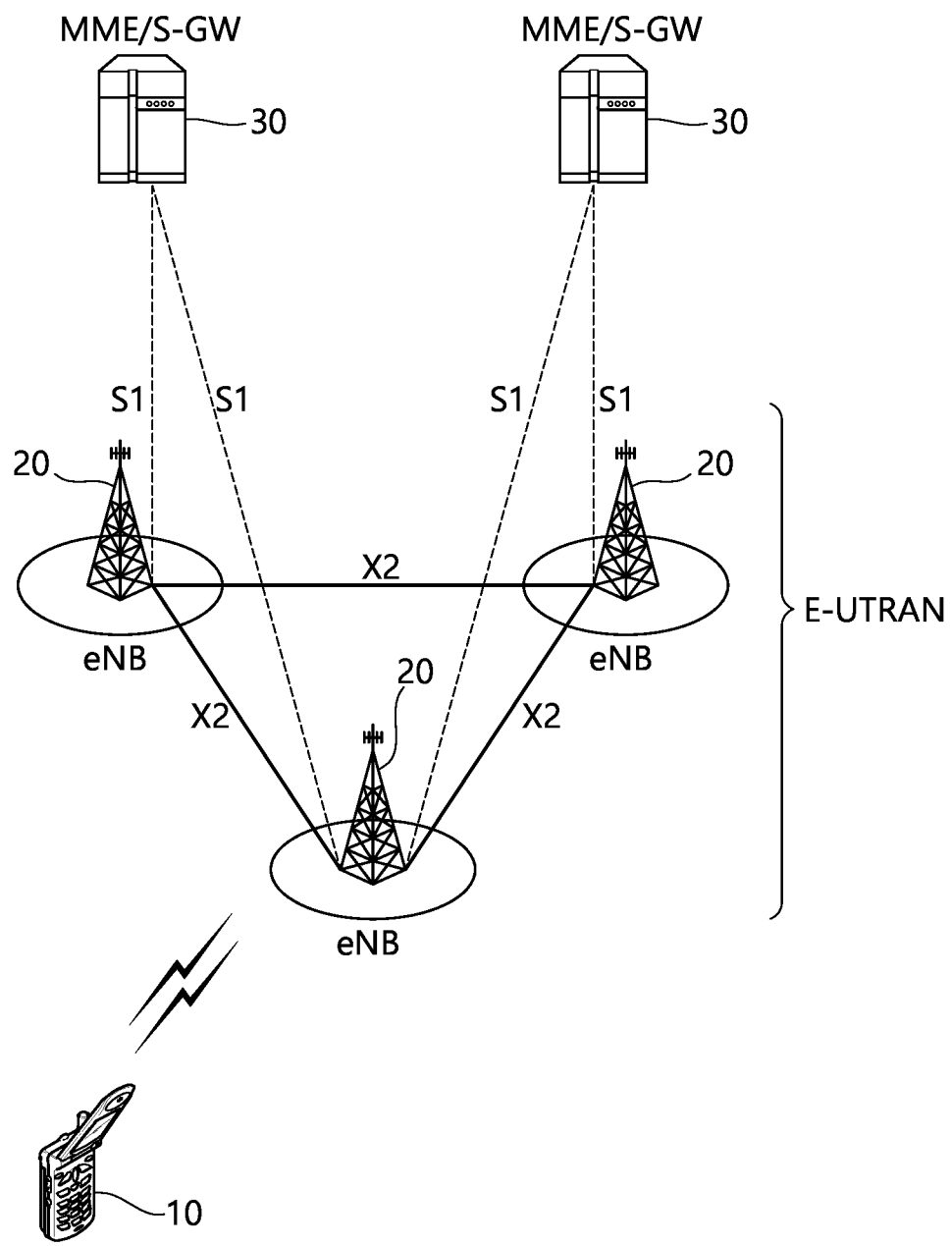
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
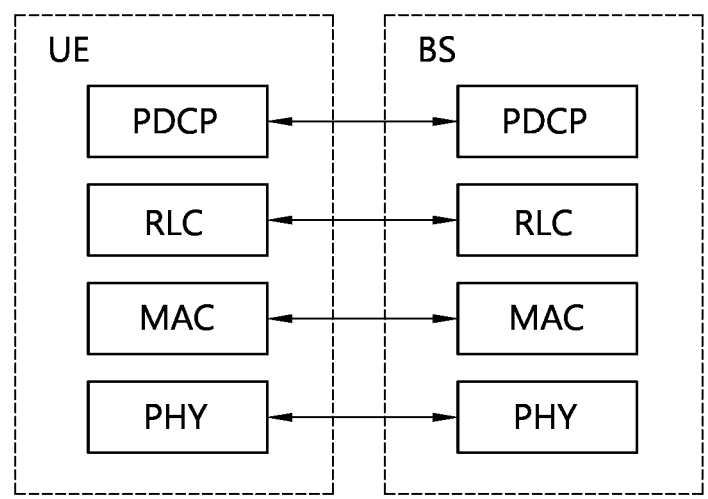
FIG. 2 is a diagram showing a wireless protocol architecture for a user plane.
Figure 3:
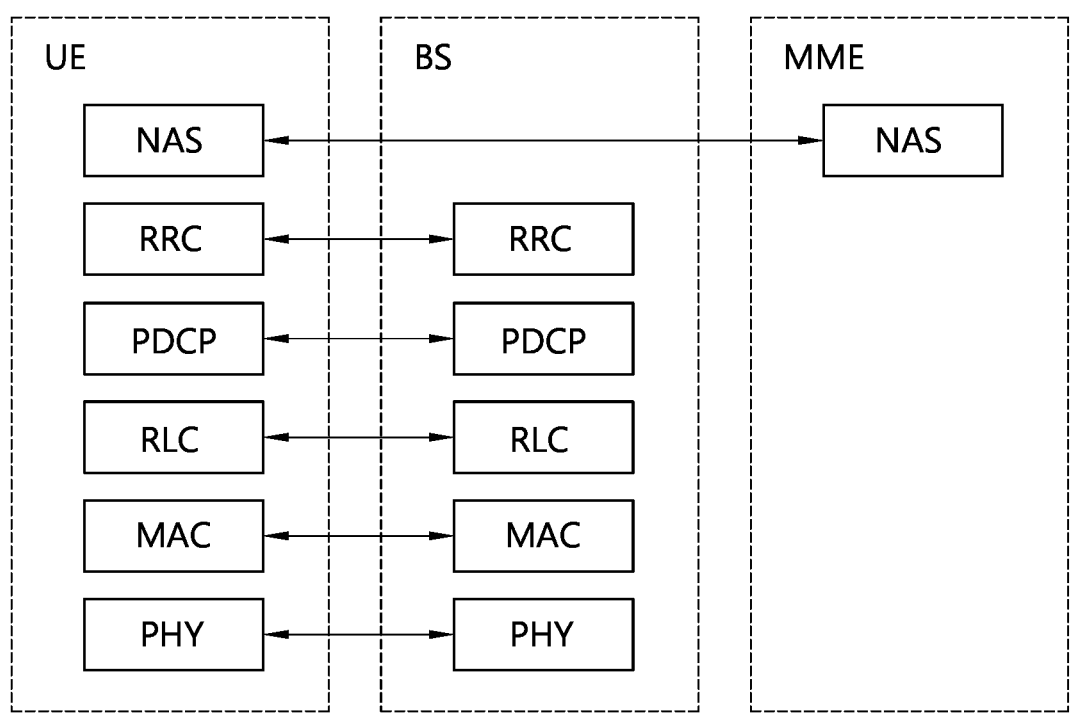
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
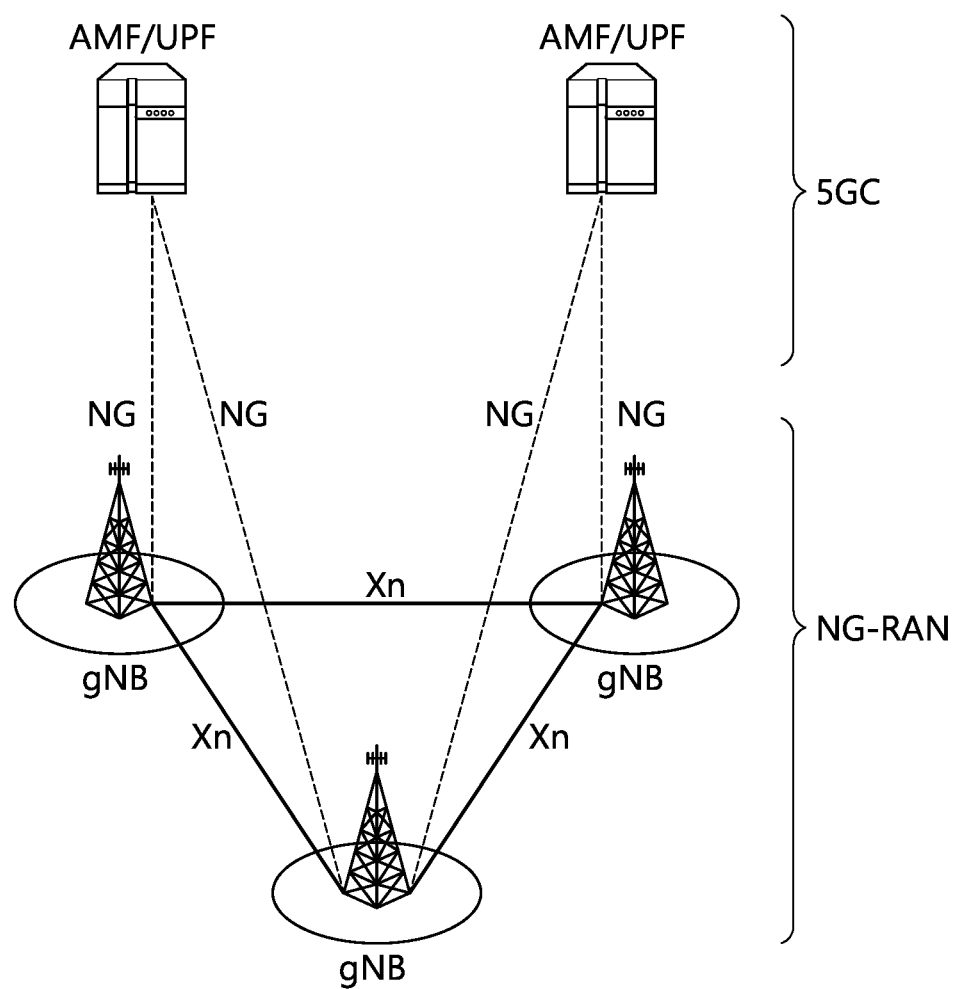
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
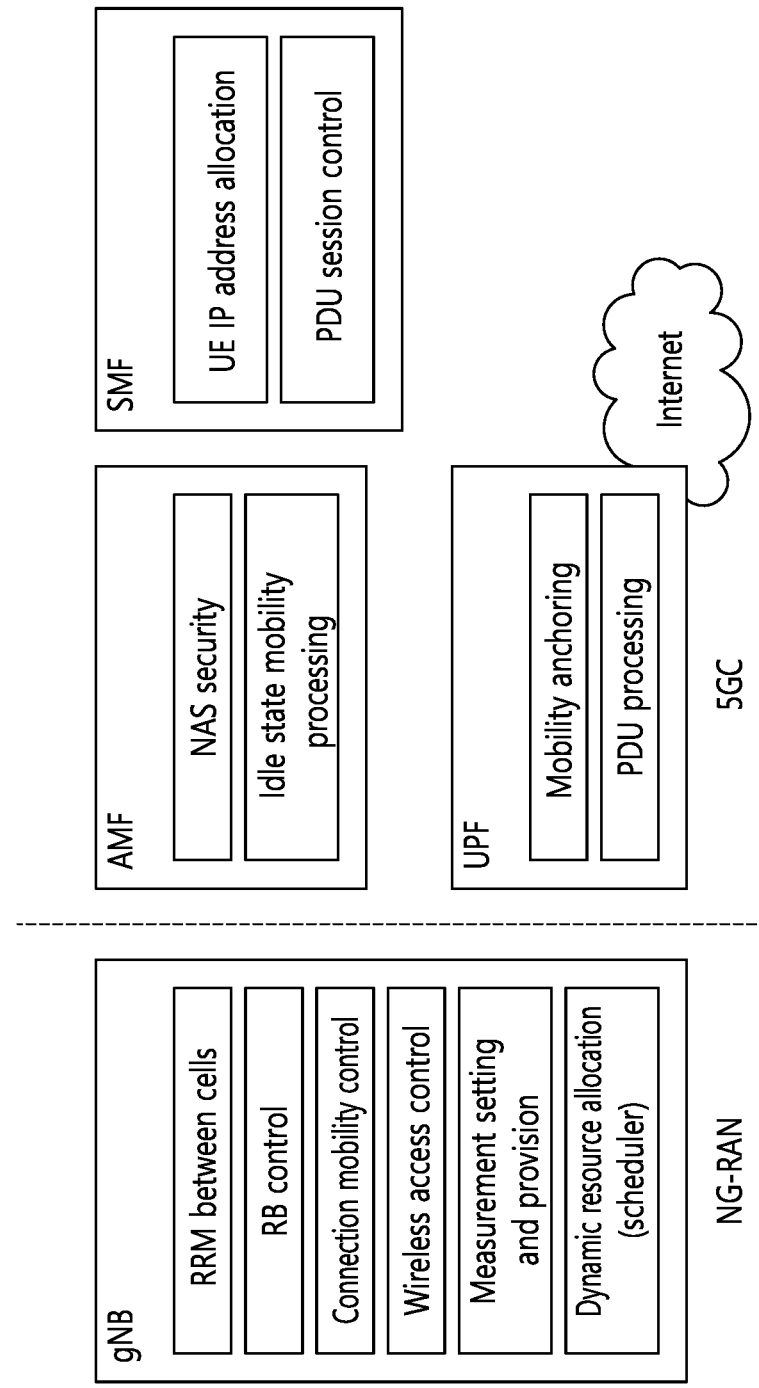
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
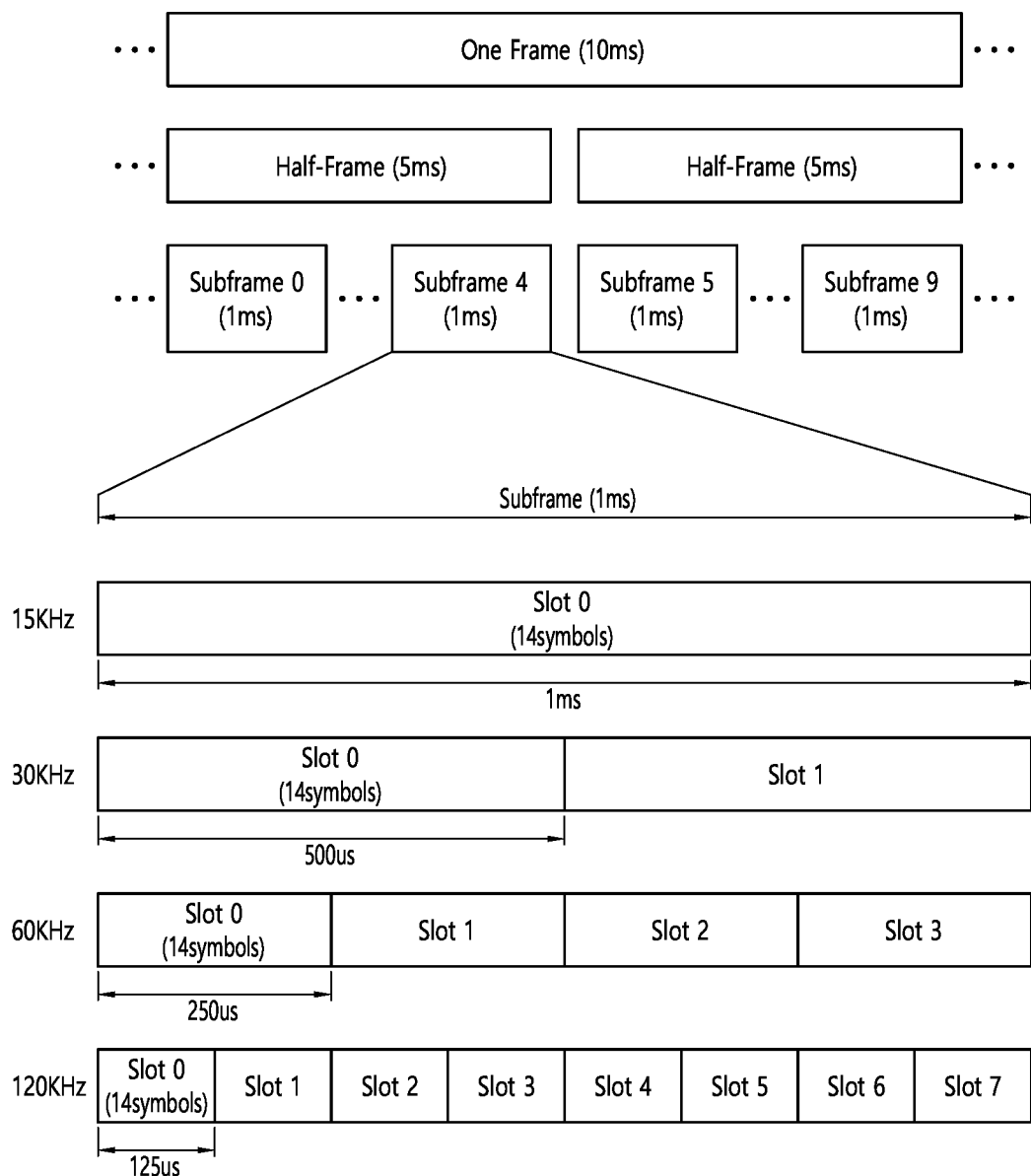
FIG. 6 illustrates an example of a frame structure that may be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration $\mu$.

TABLE 1

| $\mu$ | $\Delta f = 2^{\mu} \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of $\mu$=0, 1, 2, 3.

Table 2-1 below illustrates that the number of symbols per slot, the number of slots per frame, and the number of slots per subframe vary depending on the SCS, in case of using an extended CP.

TABLE 2-1

| $\mu$ | $N^{slot}_{symb}$ | $N^{frame,u}_{slot}$ | $N^{subframe,u}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
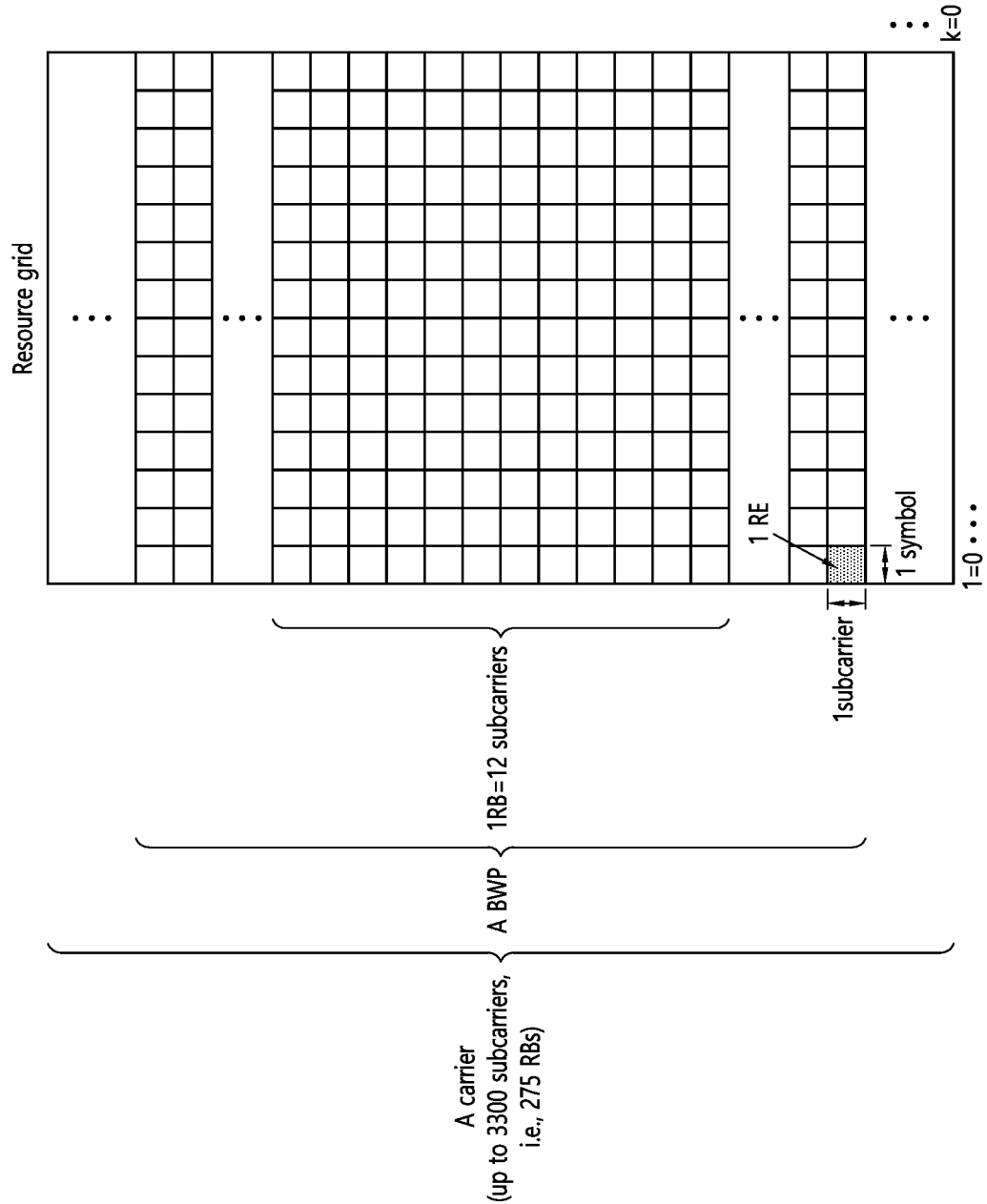
FIG. 7 illustrates a slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
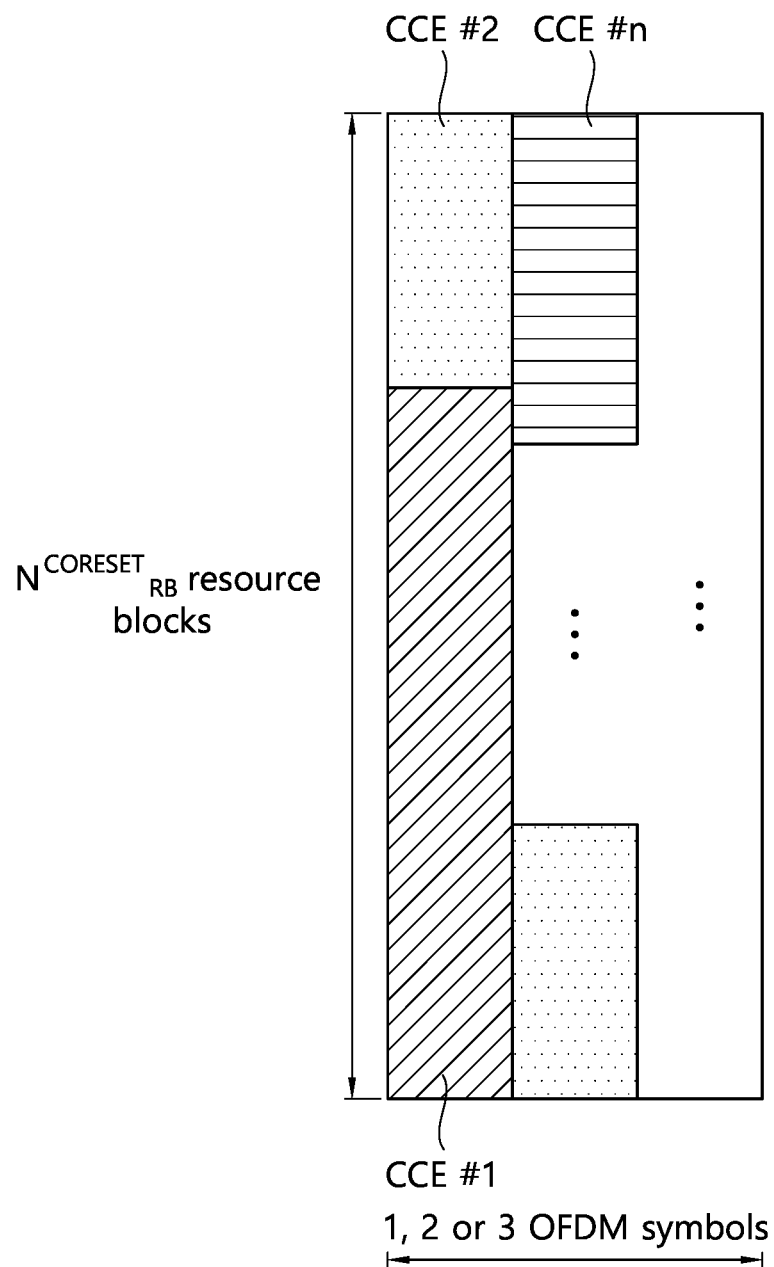
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
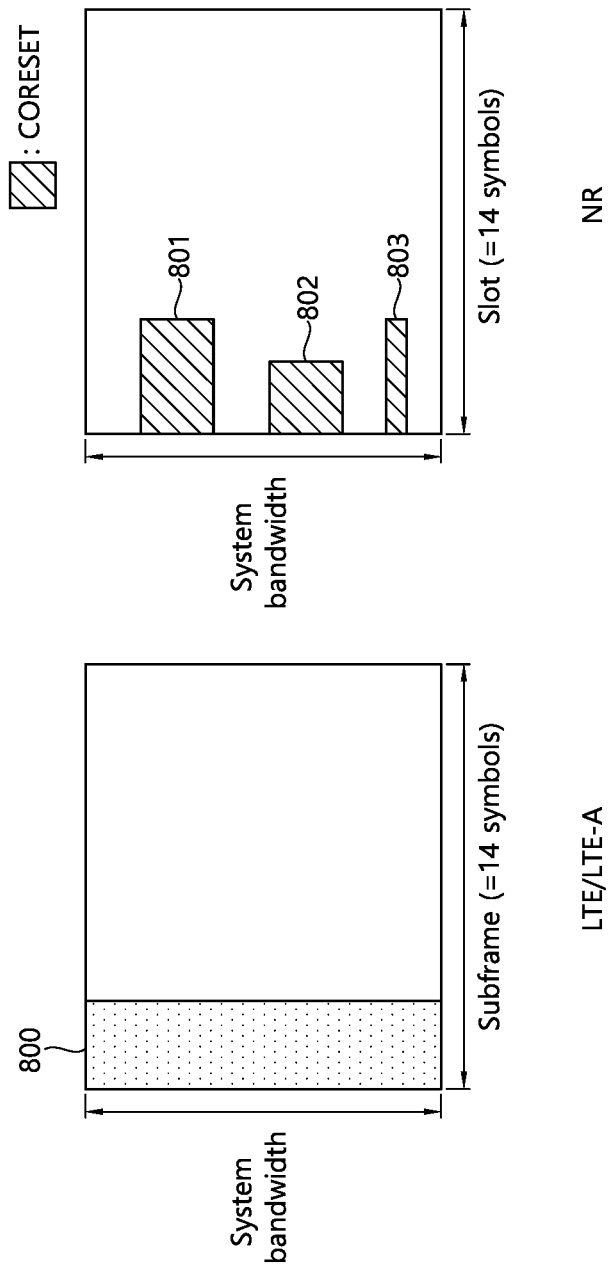
FIG. 9 is a diagram illustrating a difference between a related art control region and the CORESET in NR.

FIG. 9 is a diagram illustrating a difference between a related art control region and the CORESET in NR.

Referring to FIG. 9, a control region 800 in the related art wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
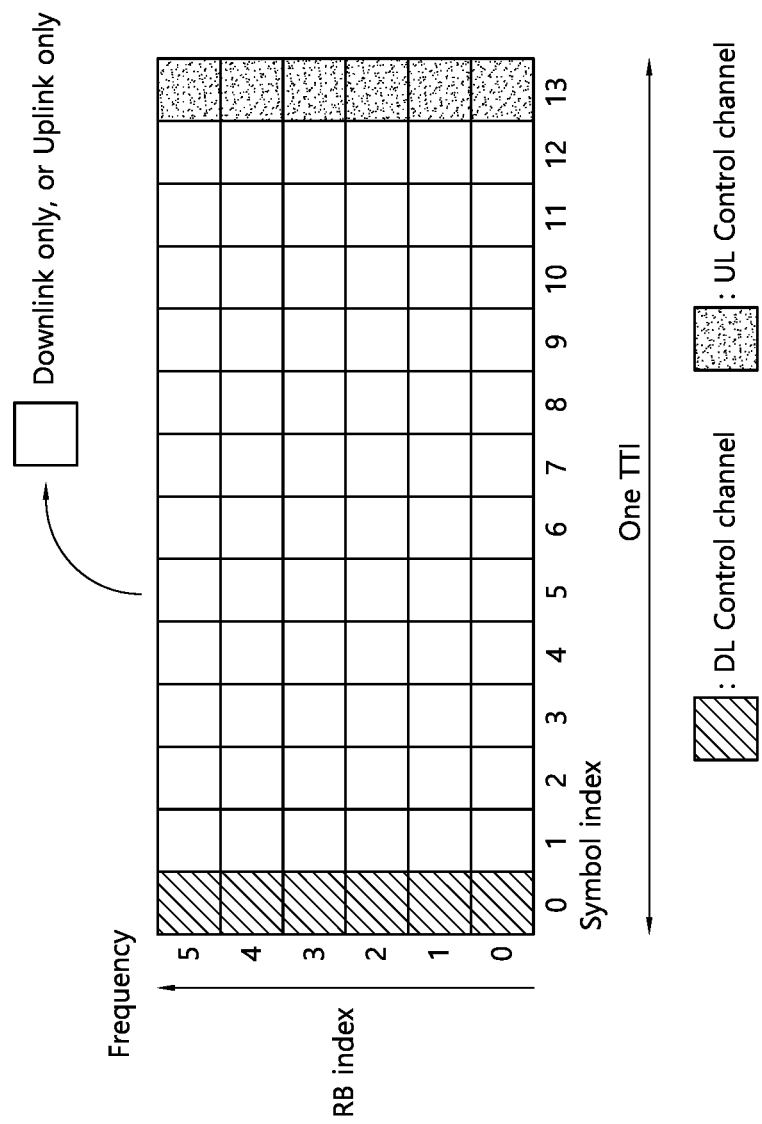
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
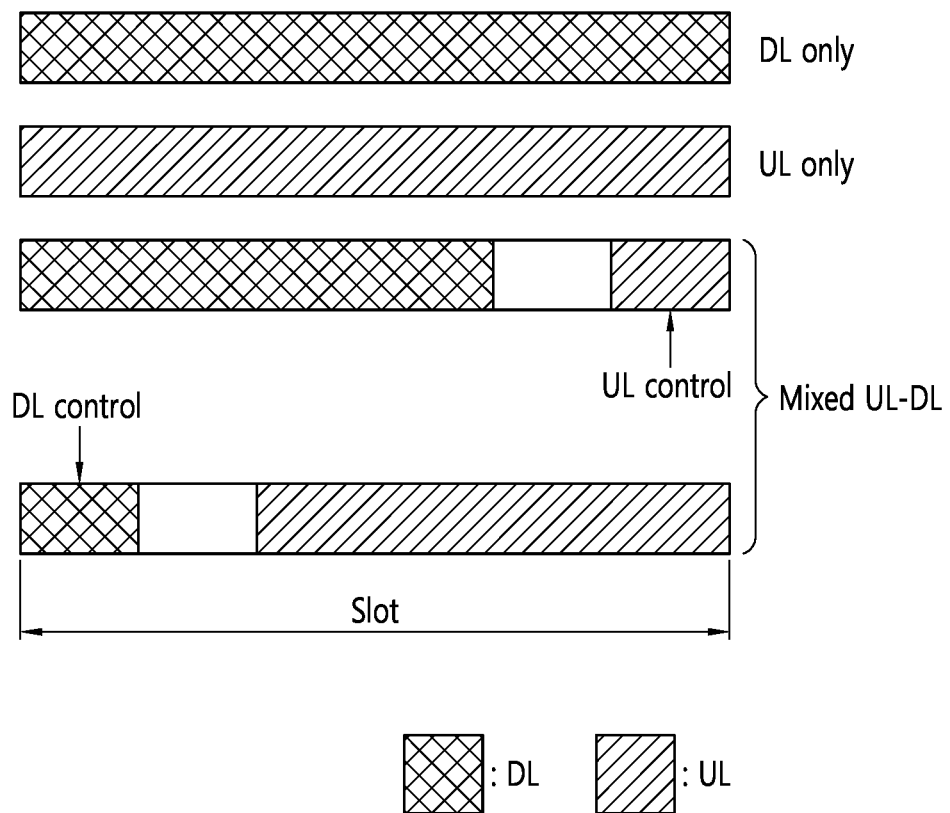
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0<s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
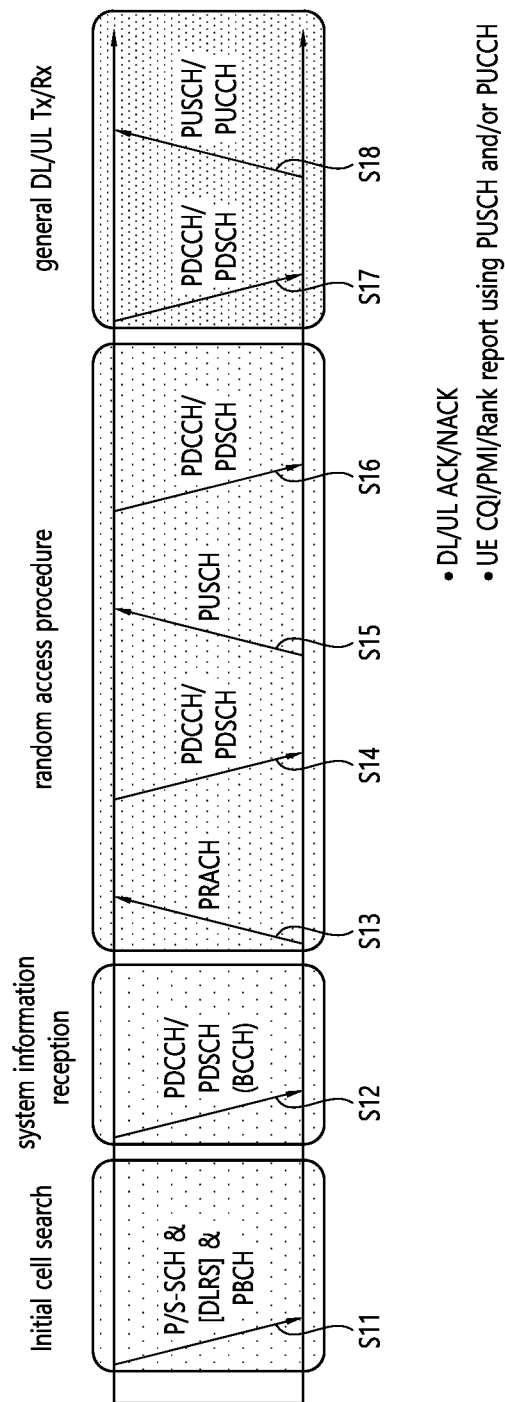
FIG. 12 illustrates physical channels and typical signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13-S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, opportunities are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Technical features that are individually described in one drawing in this specification may be implemented individually or simultaneously.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
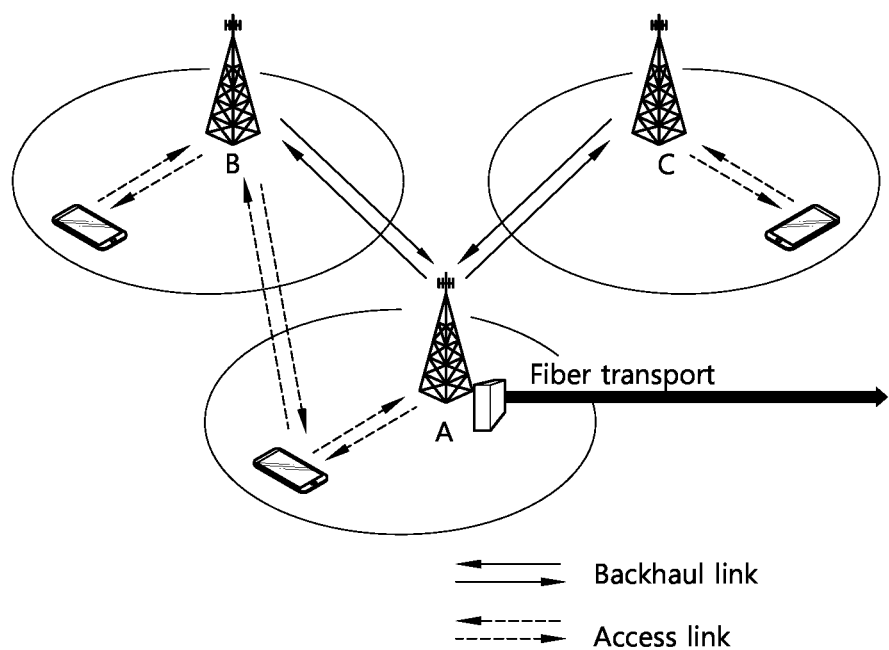
FIG. 13 schematically illustrates an example for a network with integrated access and backhaul links (IAB).

FIG. 13 schematically illustrates an example for a network with integrated access and backhaul links (IAB).

According to FIG. 13, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Efficient support of out-of-band relays may be important for some NR deployment scenarios. Close interworking with access links operating on the same frequency to accommodate duplex restrictions and avoid/mitigate interference is also very important.

Furthermore, operating the NR system in the millimeter wave spectrum may have problems such as severe short-term blocking that cannot be easily mitigated by the current RRC-based handover mechanism. Overcoming the short-term blocking in mmWave systems may require a fast RAN-based mechanism for switching between rTRPs that does not necessarily require the inclusion of a core network. It may also be necessary to develop an integrated framework that allows for fast switching of over-access and backhaul links. Over-the-air (OTA) coordination between rTRPs may also be considered to mitigate interference and support end-to-end path selection and optimization.

Addressing the following requirements in relation to IAB in NR may be necessary.

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. Thus, half-duplex is supported and deserves to be targeted in the IAB scenario. Furthermore, IAB devices having a full duplex may also be considered.

In the IAB scenario, if each relay node (RN) does not have the scheduling capability, the donor gNB (DgNB) must schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 14:
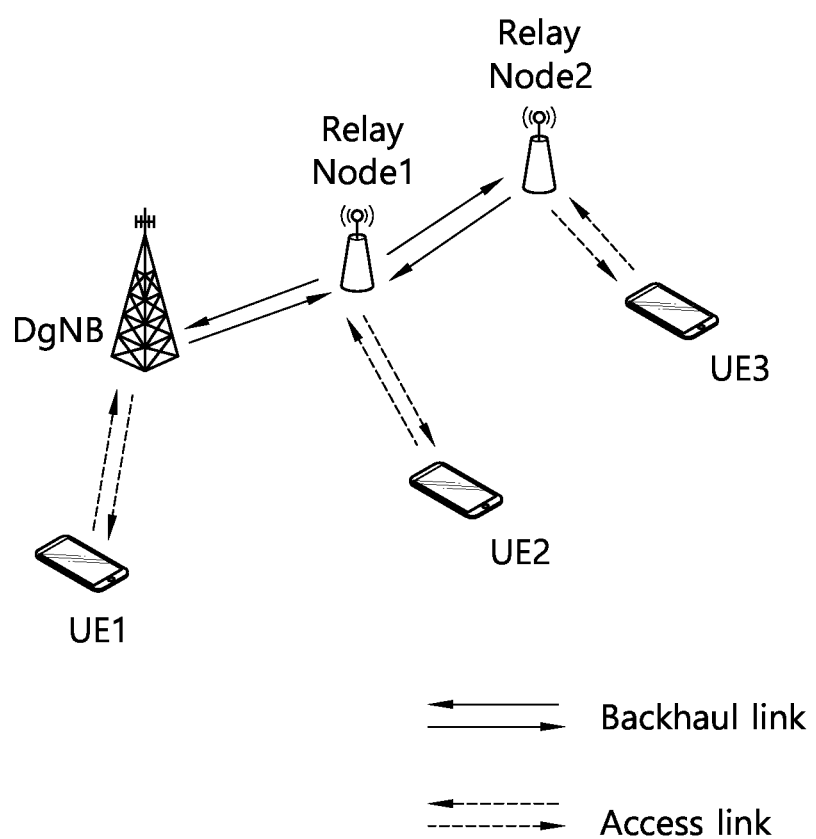
FIG. 14 schematically illustrates an example of the configuration of access and backhaul links.

FIG. 14 schematically illustrates an example of the configuration of access and backhaul links.

FIG. 14 illustrates an example in which a backhaul link and an access link are configured when DgNB and IAB relay nodes (RNs) exist. The DgNB, relay node 1, and relay node 2 are connected to a backhaul link, and UEs 1, 2, and 3 are sequentially connected to the DgNB, relay node 1, and relay node 2 through the access link.

The DgNB may make a scheduling decision of two backhaul links and three access links, and inform the scheduling results. Such centralized scheduling may include scheduling delays and cause latency issues.

If each relay node has a scheduling capability, distributed scheduling may be performed. Then, immediate scheduling of the uplink scheduling request of the UE can be performed, and the backhaul/access links can be used more flexibly by reflecting the surrounding traffic conditions.

Figure 15:
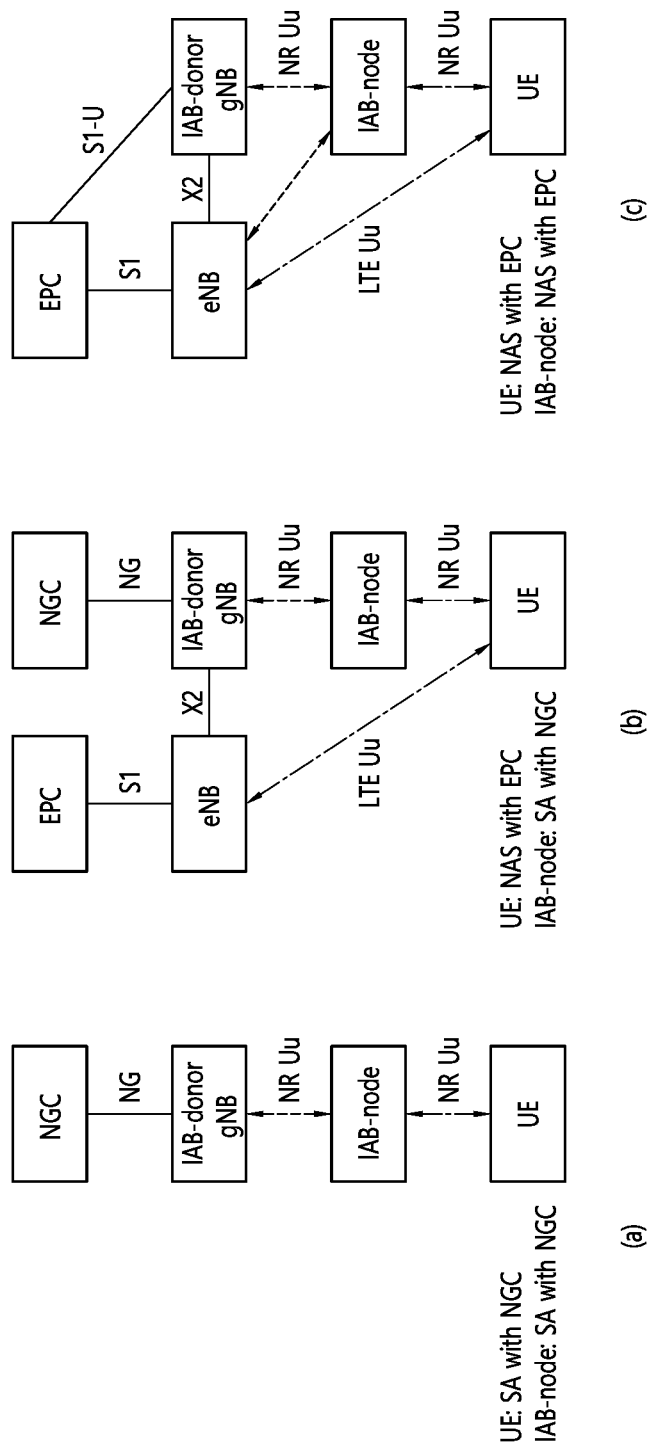
FIG. 15 illustrates the IAB node operating in stand alone (SA) mode or non-stand alone (NSA).

FIG. 15 illustrates that the IAB node operates in stand alone (SA) mode or non-stand alone (NSA).

FIG. 15 (*a*) illustrates that both the UE and the IAB node operate in SA mode in relation to the NGC, FIG. 15 (*b*) illustrates that the UE operates in the NSA mode in relation to the EPC while the IAB node operates in the SA mode in the relation with the NGC, and FIG. 15 (*c*) illustrates that both the UE and the IAB node operate in the NSA mode in relation to the EPC.

That is, the IAB node may operate in SA mode or NSA mode. When operating in NSA mode, the IAB node uses only the NR link for backhauling. A UE connecting to the IAB node may select an operation mode different from that of the IAB node. The UE may additionally connect to a different type of core network than the connected IAB node. IAB nodes operating in NSA mode may be connected to the same or different eNBs. A UE operating in the NSA node may connect to the same or different eNB as the connected IAB node.

Figure 16:
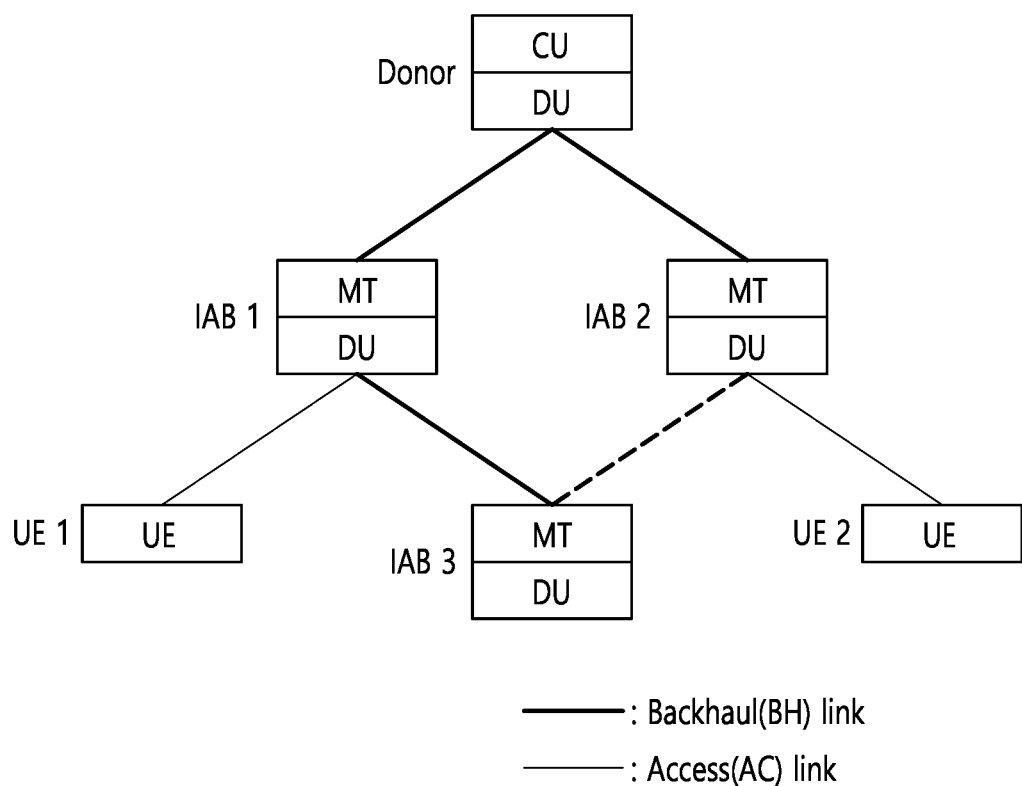
FIG. 16 illustrates a backhaul link and an access link.

FIG. 16 illustrates a backhaul link and an access link.

Referring to FIG. 16, a link between a donor node (which may be referred to as a parent node) and an IAB node or a link between IAB nodes is called a backhaul link. On the other hand, the link between the donor node and the UE or the link between the IAB node and the UE is called an access link. Specifically, the link between the MT of the IAB node and the DU of the parent node or the link between the DU of the IAB node and the MT of the child node of the IAB node is called a backhaul link, and the link between the DU of the IAB node and the UE may be referred to as an access link.

For communication with the parent node, the IAB node may be provided with an MT configuration indicating link direction information on a backhaul link between the parent node and itself. In addition, for communication with the child node, the IAB node may be provided with a DU configuration that informs the link direction for an access link between the child node/access UE and itself and link availability information.

In the existing IAB node, the DU and the MT performed TDM operation which is to operate through different time resources. On the other hand, in a future communication system, it may be required to perform resource multiplexing such as SDM/FDM and full duplexing (FD) between DUs and MTs for efficient resource management.

Figure 17:
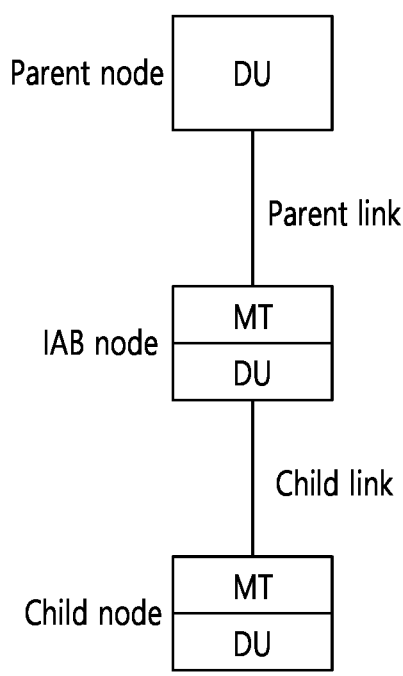
FIG. 17 illustrates a parent link and a child link.

FIG. 17 illustrates a parent link and a child link.

Referring to FIG. 17, a link between an IAB node (specifically, IAB MT) and a parent node (specifically, parent DU) is referred to as a parent link, and a link between an IAB node (specifically, IAB DU) and a child node (specifically, child MT) is called a child link. The parent link may be the above-mentioned backhaul link, and the child link may be a backhaul link or an access link depending on what the child node is. That is, if the child node is an IAB node, it may be a backhaul link, and if the child node is a UE, it may be an access link. TDM operation between parent link and child link has been previously discussed, and SDM/FDM and FD operation are currently being discussed.

From the point of view of the DU of the IAB node, there are multiple types of time resources for the child link, such as downlink (DL), uplink (UL), and flexible (F).

Each downlink, uplink and flexible time resource of the DU's child link may be a hard, soft, or unavailable (NA) resource. Here, the unavailable resource means that the resource is not used for communication of the DU child link. Hard resources means that they are always available for communication on the DU child link. Whether soft resources can be used for communication in the DU child link (availability) may be explicitly and/or implicitly controlled by the parent node.

In the present disclosure, a configuration for a link (resource) direction (DL/UL/F) and link (resource) availability (Hard/Soft/NA) of a time resource for a DU child link may be referred to as a 'DU configuration'. This configuration can be used for effective multiplexing and interference handling between IAB nodes. For example, the above configuration may be used to indicate for which link a time resource is valid for a parent link and a child link. It can also be used to coordinate interference between child nodes. Considering this aspect, the DU configuration may be more effective when configured semi-statically and configured specifically for an IAB node.

The availability of soft resources can be dynamically configured through physical layer (L1)-based implicit/explicit signals. Hereinafter, "IA" may mean that the DU resource is explicitly or implicitly indicated as available, and "INA" may mean that the DU resource is explicitly or implicitly indicated that it is unavailable. Dynamic L1-based signaling may indicate whether the DU soft resource is "IA" or "INA".

From a DU perspective, a soft resource may be in an IA (indicated as available) state or a non-IA state. In this case, the non-IA state may be interpreted as an INA (indicated as not available) state. Whether the soft resource is IA may be indicated through AI (availability indicator) information, and the AI information may be indicated from the parent node to the IAB node through AI-DCI. The following DCI format 2_5 is an example of AI-DCI.

<DCI format 2_5>

DCI format 2_5 is a DCI format used to inform the availability of soft resources. The following information may be transmitted through DCI format 2_5 together with CRC scrambled by AI-RNTI.

Availability indicator 1, availability indicator 2, . . . , availability indicator N.

The size of DCI format 2_5 with CRC scrambled by AI-RNTI may be configured by a higher layer up to 128 bits.

Similar to the SFI configuration for the access link, the IAB node MT may have three types of time resources for the parent link: downlink (DL), uplink (UL), and flexible (F).

DU and MT existing in the same IAB node (or co-located) may not operate at the same time and may operate in TDM, for some reason such as intra-node interference, slot/symbol boundary misalignment, power sharing, etc.

On the other hand, SDM/FDM multiplexing may be used between the DU and the MT. For example, it is applicable when the DU and the MT use different panels and there is little interference effect between the panels. In this case, the DU and the MT that exist in the same IAB node (or are co-located) can transmit (DU transmit, MT transmit) or receive (DU receive, MT receive) at the same time. (It is impossible for DU and MT to simultaneously perform transmission and reception (DU transmission, MT reception) or reception and transmission (DU reception, MT transmission), respectively).

Alternatively, full duplexing (FD) may be used between the DU and the MT. For example, it is applicable to a case where there is little interference effect between the DU and the MT, such as a case in which the frequency region in which the DU operates and the frequency region in which the MT operates are far apart. In this case, the DU and the MT that exist in the same IAB node (or are co-located) can freely transmit and receive at the same time. The DU and the MT can transmit or receive at the same time, and it is also possible for the DU and the MT to simultaneously perform transmission and reception or reception and transmission, respectively.

The MT and DU of the IAB node may be configured with a plurality of component carriers (CCs) (meaning that a plurality of CCs are used). In this case, different CCs may operate in the same or different frequency regions or may use the same or different panels.

Figure 18:
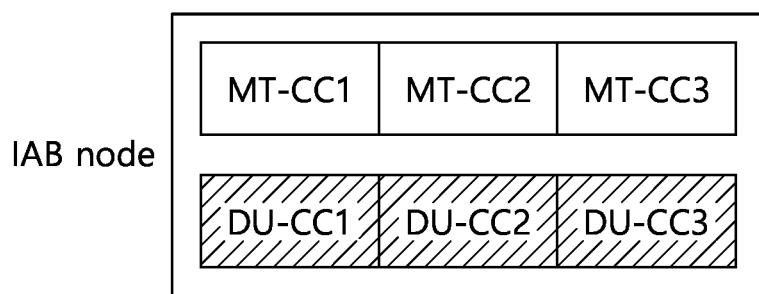
FIG. 18 shows an example of using a plurality of CCs in MT and DU of an IAB node.

FIG. 18 shows an example of using a plurality of CCs in MT and DU of an IAB node.

Referring to FIG. 18, the MT and DU of the IAB node may use a plurality of component carriers (CCs) (or it may be expressed that the MT and the DU of the IAB node consist of a plurality of CCs).

In this case, different CCs may operate in the same or different frequency regions or may use the same or different panels. For example, as shown in FIG. 18, each of three CCs may exist in the MT and the DU in the IAB node. The three CCs in the MT are called MT-CC1, MT-CC2, and MT-CC3, respectively, and the three CCs in the DU are called DU-CC1, DU-CC2, and DU-CC3, respectively.

In this case, one multiplexing scheme among TDM, SDM/FDM, and FD may be applied between the specific CC of the MT and the specific CC of the DU. For example, when a specific MT-CC and a DU-CC are located in different inter-band frequency regions, FD may be applied between the corresponding MT-CC and the DU-CC.

On the other hand, the TDM scheme may be applied between the MT-CC and the DU-CC located in the same frequency region. For example, in FIG. 18, MT-CC1, MT-CC2, DU-CC1, DU-CC2 has f1 as a center frequency, MT-CC3, DU-CC3 has f2 as a center frequency, f1 and f2 may be located within an inter-band of each other. In this case, MT-CC1 (or MT-CC2) may operate in TDM with DU-CC1 and DU-CC2, but may operate in FD with DU-CC3. On the other hand, from the standpoint of MT-CC3, it operates in FD with DU-CC1 and DU-CC2, but may operate in TDM with DU-CC3.

On the other hand, a different multiplexing scheme between the MT and the DU may be applied even within the same CC. For example, a plurality of parts may exist within the CC of the MT and/or DU. This part may mean, for example, a link transmitted through an antenna having the same center frequency but a different physical location or a different panel. Alternatively, the part may mean, for example, a link having the same center frequency but transmitted through different BWPs. In this case, for example, when two parts exist in DU-CC1, a multiplexing type operating with a specific MT-CC or a specific part in a specific MT-CC may be different for each part. The following disclosure describes a case in which the multiplexing type applied to each pair of the MT CC and the DU CC may be different, the disclosure may be extended and applied even when MT and DU are divided into a plurality of parts and a multiplexing type applied to each pair of CC and part of MT and CC and part of DU may be different.

In the context of the present disclosure, the DU-CC may be interpreted as being replaced with a DU cell.

The Tx/Rx timing alignment method of the IAB node that can be considered in the IAB environment may be as follows.

Case 1: Alignment of DL transmission timing between IAB node and IAB donor.

Case 2: DL and UL transmission timings are aligned within the IAB node.

Case 3: DL and UL reception timings are aligned within the IAB node.

Case 4: Within the IAB node, use case 2 for transmission and case 3 for reception.

Case 5: In different time slots within the IAB node, use case 1 for access link timing and case 4 for backhaul link timing.

Case 6: Using the DL transmission timing of case 1 and the UL transmission timing of case 2.

Case 7: Using the DL transmission timing of case 1 and the UL transmission timing of case 3.

Hereinafter, some cases among the timing alignment cases will be described in more detail.

Timing Alignment Case 1 (Hereinafter May be Abbreviated as Case 1).

Figure 19:
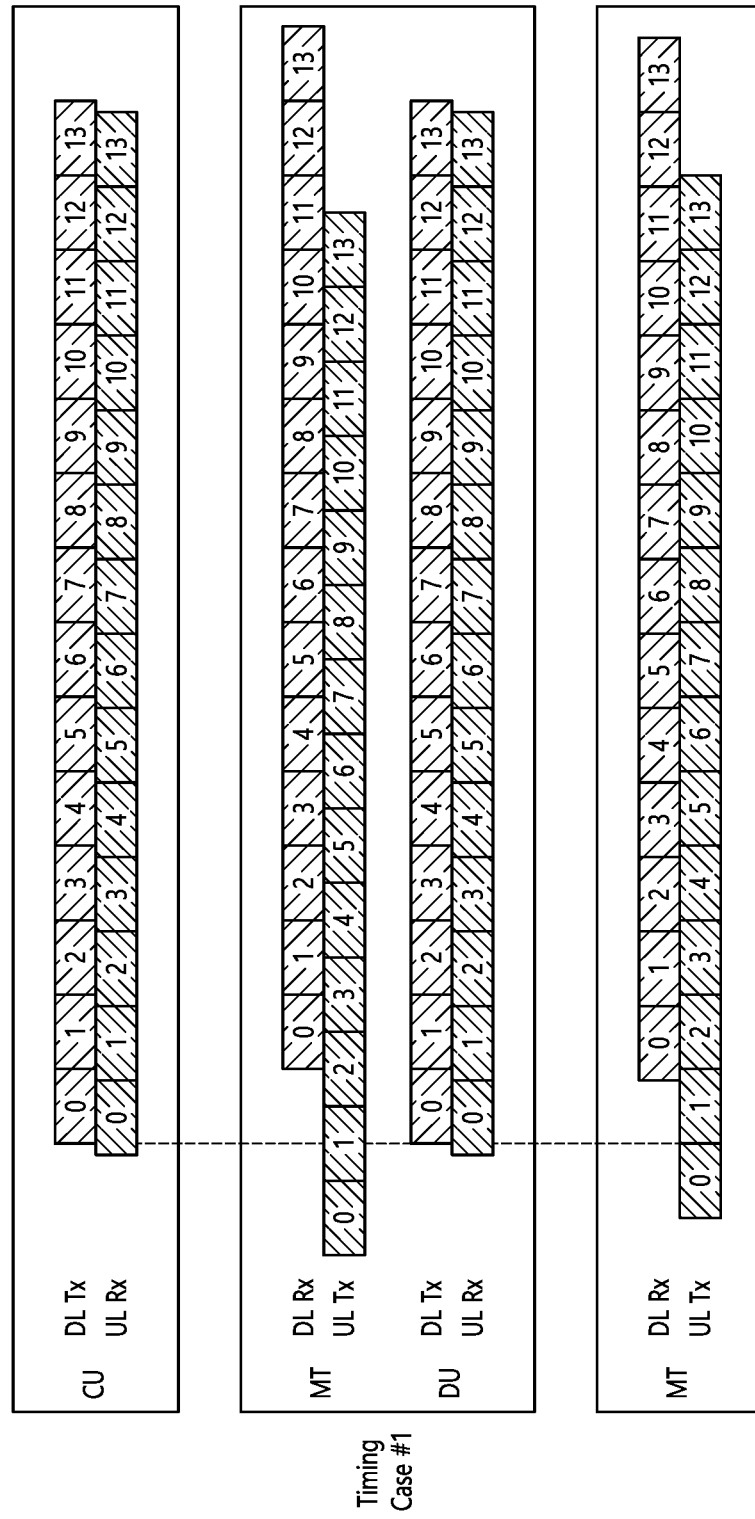
FIG. 19 illustrates timing alignment case 1.

FIG. 19 illustrates timing alignment case 1.

Referring to FIG. 19, in case 1, DL transmission (Tx) timing is aligned between an IAB node and an IAB donor (represented by a CU). That is, the DL Tx timing of DUs between IAB nodes is aligned, and this is a timing alignment method used by the Rel-16 IAB node.

If the DL Tx and UL Rx are not well aligned in the parent node, additional information about alignment may be required for the child node to properly set the DL Tx timing. The MT Tx timing may be expressed as 'MT Rx timing−TA', and the DU Tx timing may be expressed as 'MT Rx timing−TA/2−T_delta'. The T_delta value can be obtained from the parent node.

Timing Alignment Case 6 (Hereinafter May be Abbreviated as Case 6)

Figure 20:
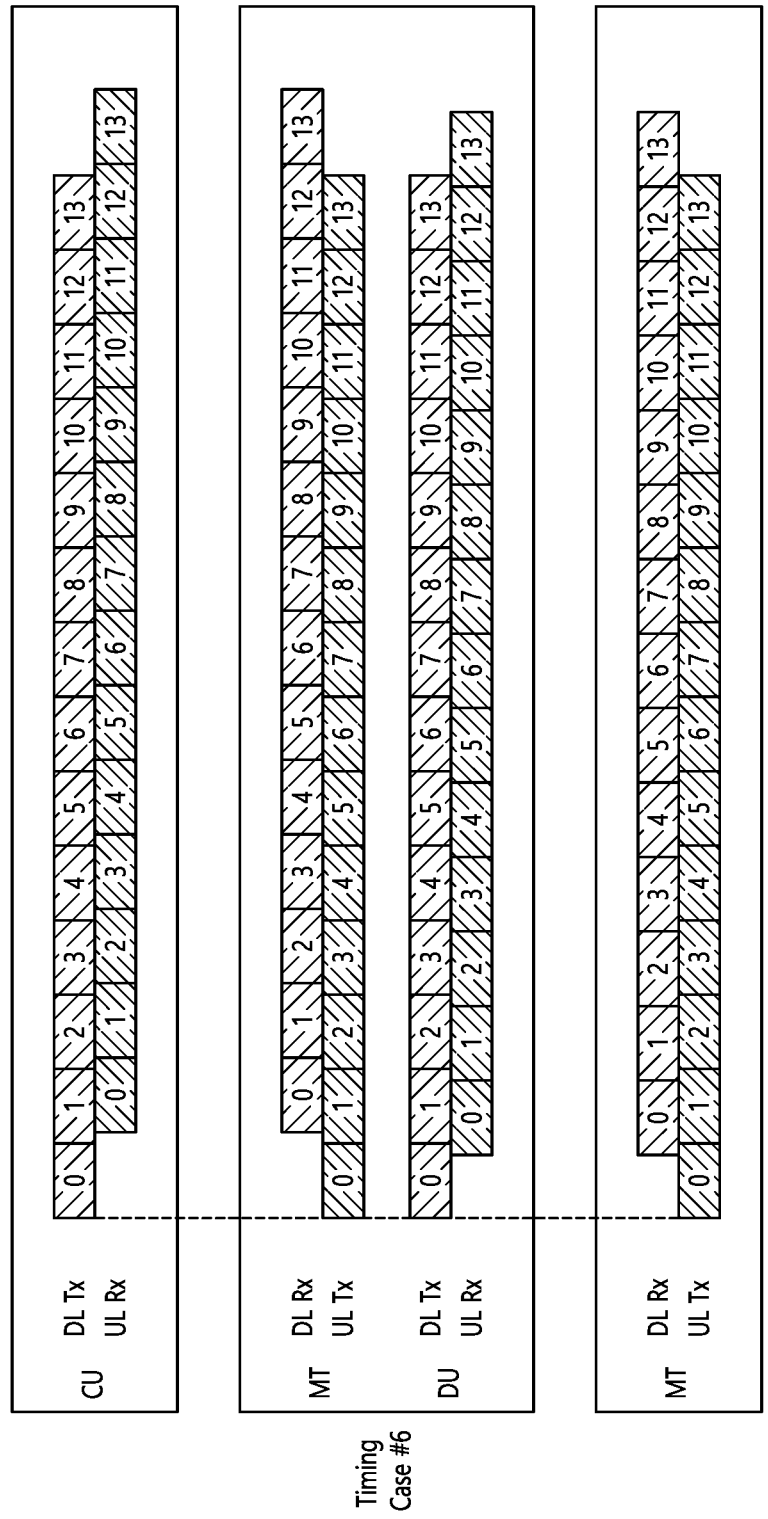
FIG. 20 illustrates timing alignment case 6.

FIG. 20 illustrates timing alignment case 6.

Referring to FIG. 20, Case 6 is a case in which DL transmission timings for all IAB nodes coincide with parent IAB node (CU) or donor DL timings. The UL transmission timing of the IAB node may be aligned with the DL transmission timing of the IAB node. That is, the MT UL Tx timing and the DU DL Tx timing of the IAB node are aligned.

Since the UL Tx timing of the MT is fixed, the UL Rx timing of the parent-DU receiving it is delayed by the propagation delay of the parent-DU and the MT compared to the UL Tx timing of the MT. The UL Rx timing of the MT varies according to the child MT that transmits the UL. When the IAB node uses the timing alignment case 6, the UL Rx timing of the parent node is different from the existing one. Therefore, if the IAB node wants to use the timing alignment case 6, the parent node also needs to know the corresponding information.

Timing Alignment Case 7.

Figure 21:
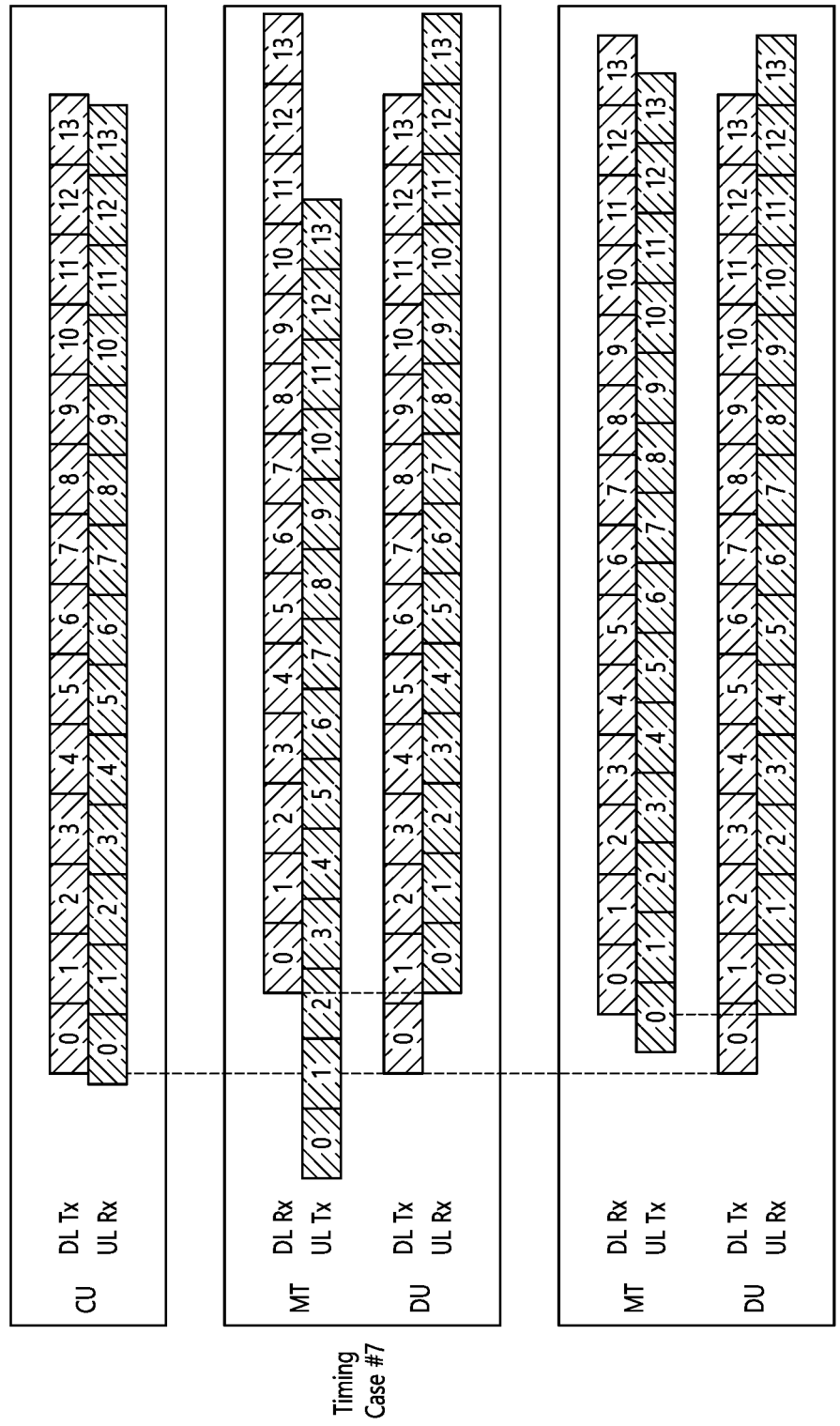
FIG. 21 illustrates timing alignment case 7.

FIG. 21 illustrates timing alignment case 7.

Referring to FIG. 21, in case 7, DL transmission timings for all IAB nodes coincide with parent IAB node or donor DL timings. The UL reception timing of the IAB node may coincide with the DL reception timing of the IAB node. If the DL Tx and UL Rx are not well aligned in the parent node, additional information about alignment may be required for the child node to properly set the DL Tx timing. Case 7 is a scheme in which the MT DL Rx timing of the IAB node and the DU UL Rx timing are aligned.

The transmission/reception timing from the MT perspective is the same as that of the existing IAB node (Rel-16 IAB node), and the UL Rx timing of the DU may be aligned with the DL Rx timing of the MT. The IAB node needs to adjust the TA of the child MTs so that the child MTs transmit UL signals according to IAB node's UL Rx timing.

This timing alignment method may not reveal a difference in the standard operation of the IAB node compared to the existing timing alignment method (Case 1). Accordingly, the timing alignment case 7 may be replaced/interpreted as the timing alignment case 1.

In the present disclosure, timing alignment may mean slot-level alignment or symbol-level alignment.

In the present disclosure, a multiplexing type applicable between a Distributed Unit (DU) and a Mobile Terminal (MT) of a specific IAB node is described, and an operation resource of the MT and the DU according to the multiplexing type is determined. Furthermore, an IAB node operation in the case where the multiplexing type of the specific IAB node changes according to time/situation is also proposed.

A. Simultaneous operation for IAB MT and DU

In the present disclosure, an IAB node may mean a specific MT-CC/DU-cell pair in the IAB node. That is, the IAB node may mean a physical device, but may also indicate a frequency band in which the physical device operates.

Figure 22:
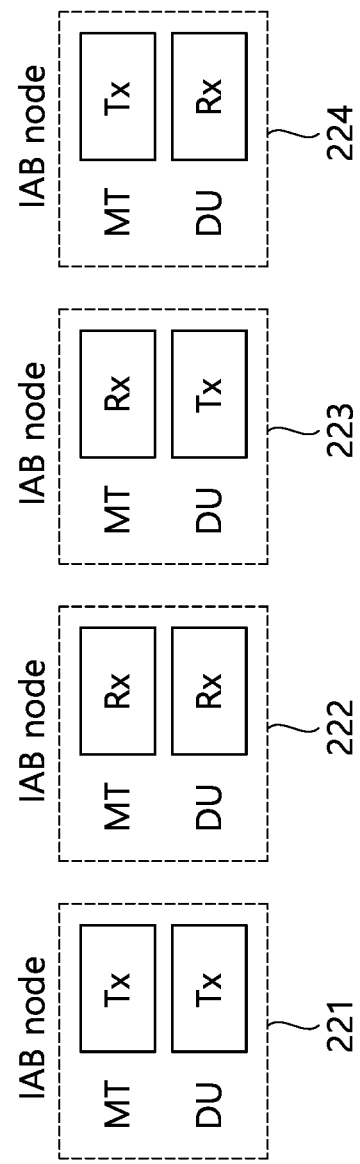
FIG. 22 shows a Tx/Rx combination of an IAB node including an MT and a DU.

FIG. 22 shows a Tx/Rx combination of an IAB node including an MT and a DU.

Referring to FIG. 22, a transmission/reception (Tx/Rx) combination that the IAB node can perform may be the following four.

1) DU-Tx/MT-Tx (221). For example, the DU may transmit a signal to a UE or a child node using a downlink frequency band, and the MT may transmit a signal to a parent node or a donor node using an uplink frequency band.

2) DU-Rx/MT-Rx (222). The DU may receive a signal from a UE or a child node using an uplink frequency band, and the MT may receive a signal from a parent node or a donor node using a downlink frequency band.

3) DU-Tx/MT-Rx (223). The DU may transmit a signal to a UE or a child node using a downlink frequency band, and the MT may receive a signal from a parent node or a donor node using the downlink frequency band.

4) DU-Rx/MT-Tx (224). The DU may receive a signal from a UE or a child node using an uplink frequency band, and the MT may transmit a signal to a parent node or a donor node using the uplink frequency band.

The IAB node may operate in TDM or no-TDM for each of these four transmission/reception (Tx/Rx) combinations. The Tx/Rx combination may be referred to as a Tx/Rx direction combination.

Figure 23:
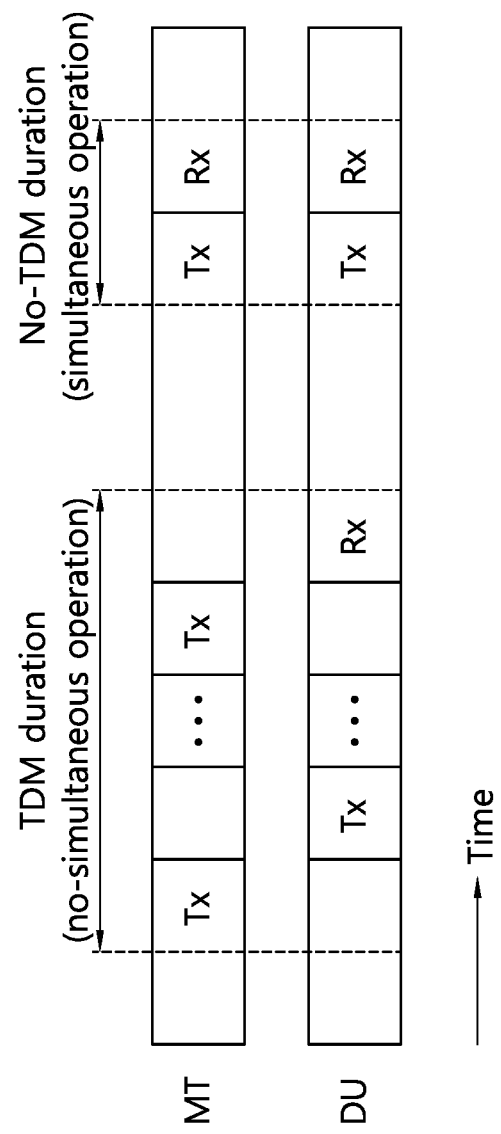
FIG. 23 shows an example in which the IAB node operates in TDM and no-TDM for Tx/Rx combination.

FIG. 23 shows an example in which the IAB node operates in TDM and no-TDM for Tx/Rx combination.

Referring to FIG. 23, in the TDM duration, the MT and the DU of the IAB node operate at different times without performing simultaneous operations. For example, the DU does not perform transmission in the time resource transmitted by the MT, and the MT does not perform transmission in the time resource transmitted by the DU. As another example, the DU does not perform reception in the time resource transmitted by the MT, and the MT does not perform transmission in the time resource the DU receives.

In the no-TDM duration, the IAB node may perform simultaneous operations. For example, the MT and the DU of the IAB node may perform simultaneous transmission or simultaneous reception in the same time resource.

Whether to operate in TDM or no-TDM with respect to the Tx/Rx combination for each IAB node may be independently (or differently) configured.

For example, IAB node 1 may operate in TDM for all four Tx/Rx combinations described above. For example, the IAB node 1 operates 'DU-Tx/MT-Tx' as TDM, which means that the DU transmission operation and the MT transmission operation are performed at different times.

On the other hand, IAB node 2 may operate in no-TDM for some Tx/Rx combinations (e.g., 'DU-Tx/MT-Tx' and 'DU-Rx/MT-Rx') among the four Tx/Rx combinations, and may operate in TDM for the remaining Tx/Rx combinations. That is, the DU transmission (DU-Tx) operation and the MT transmission (MT-Tx) operation can be performed simultaneously, and the DU reception (DU-Rx) operation and the MT reception (MT-Rx) operation are simultaneously performed. On the other hand, the DU transmission (DU-Tx) operation and the MT reception (MT-Rx) operation, and the DU reception (DU-Rx) operation and the MT transmission (MT-Tx) operation are performed at different times. In the IAB node 2, when both the DU and the MT are configured to perform a transmission (Tx) operation or a reception (Rx) operation in a specific time resource, the DU and the MT may perform a simultaneous operation.

IAB node 3 may operate in no-TDM for all four Tx/Rx combinations. In this case, IAB node 3 may perform simultaneous operation in all time resources. However, although simultaneous operation between the DU and the MT can be performed (even if supported), only one of the DU and the MT may operate if there is no channel/signal for the DU or the MT to transmit/receive.

Hereinafter, for convenience of description, TDM/no-TDM information for each of the four Tx/Rx combinations of the IAB node as described above is referred to as a 'multiplexing type' of the IAB node. For example, if TDM/no-TDM information for each Tx/Rx combination of IAB node 1 and IAB node 2 is configured identically, IAB node 1 and IAB node 2 have the same multiplexing type. When TDM/no-TDM information for each Tx/Rx combination of IAB Node 1 and IAB Node 2 is configured differently, IAB Node 1 and IAB Node 2 have different multiplexing types.

For convenience, the multiplexing type may be referred to as follows.

a) TDM

If the IAB node has a multiplexing type set to TDM for DU-Tx/MT-Tx, DU-Rx/MT-Rx, DU-Tx/MT-Rx, DU-Rx/MT-Tx, it is called that the IAB node performs a 'TDM' operation between the DU and the MT. That is, it can be referred to as having a TDM multiplexing type.

b) Tx-SDM/FDM

When the IAB node is set to no-TDM between DU-Tx/MT-Tx and has a multiplexing type set to TDM for the remaining Tx/Rx combinations, it is called that the IAB node performs a 'Tx-SDM/FDM' operation between the DU and the MT. That is, it can be referred to as having a multiplexing type of Tx-SDM/FDM.

c) Rx-SDM/FDM

When the IAB node is set to no-TDM between DU-Rx/MT-Rx and has a multiplexing type set to TDM for the remaining Tx/Rx combinations, it is called that the IAB node performs a 'Rx-SDM/FDM' operation between the DU and the MT. That is, it can be referred to as having a multiplexing type of Rx-SDM/FDM.

d) Tx/Rx-SDM/FDM

If the IAB node is configured as no-TDM between DU-Tx/MT-Tx and DU-Rx/MT-Rx, and has a multiplexing type set to TDM for the remaining Tx/Rx combinations, it is called that the IAB node performs a 'Tx/Rx-SDM/FDM' operation between DU and MT. That is, it can be referred to as having a multiplexing type of Tx/Rx-SDM/FDM.

e) FD (full duplex)

If the IAB node has a multiplexing type set to no-TDM for DU-Tx/MT-Tx, DU-Rx/MT-Rx, DU-Tx/MT-Rx, DU-Rx/MT-Tx, it is called that the IAB node performs a 'FD' operation between the DU and the MT. That is, it can be referred to as having an FD multiplexing type.

A.1. DU and MT Resource Determination Method During FD Operation

Multiplexing of FD may be used between DU and MT that exist in the same IAB node (or are co-located). In this section, the operations of DU and MT in this case are proposed.

When the IAB node has a multiplexing type that operates as an FD (That is, the multiplexing type of the IAB node is configured to no-TDM for all Tx/Rx combinations of DU-Tx/MT-Tx, DU-Rx/MT-Rx, DU-Tx/MT-Rx, DU-Rx/MT-Tx), DU and MT can be operated in all time resources. In this case, the DU and the MT may ignore H/S/NA attribute information transmitted through DU configuration to determine their own operable resources. In addition, the IAB node (specifically, the IAB MT) does not monitor the AI-DCI (e.g., DCI format 2_5) transmitted to indicate the availability information of the DU operation in the soft resource.

A.2. DU and MT Resource Determination Method During SDM/FDM Operation

Multiplexing of SDM/FDM may be used between DU and MT existing (or co-located) within the same IAB node. In this section, the operations of DU and MT in this case are proposed.

Figure 24:
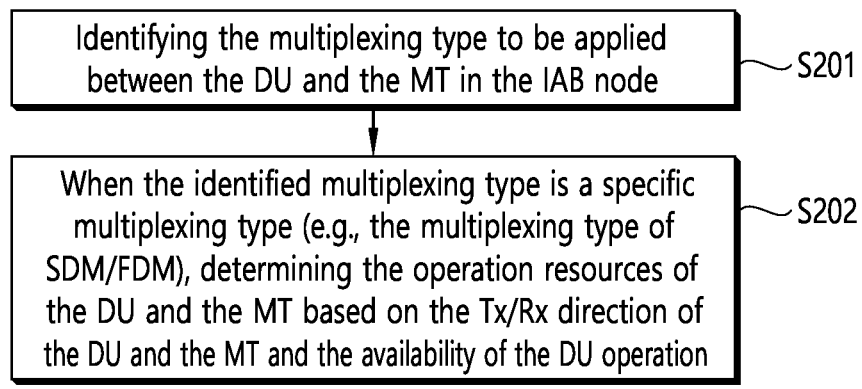
FIG. 24 is an example of an operation method of an IAB node.

FIG. 24 is an example of an operation method of an IAB node.

Referring to FIG. 24, the IAB node identifies the multiplexing type to be applied between the DU and the MT in the IAB node (S201). When the identified multiplexing type is a specific multiplexing type (e.g., the multiplexing type of SDM/FDM), it can be determined the operation resources of the DU and the MT based on the Tx/Rx direction of the DU and the MT and the availability of the DU operation (S202).

If the IAB node has a multiplexing type that does not operate as an FD, that is, the multiplexing type of the IAB node is set to no-TDM only for some combinations of DU-Tx/MT-Tx, DU-Rx/MT-Rx, DU-Tx/MT-Rx, DU-Rx/MT-Tx, or if set to no-TDM only for DU-Tx/MT-Tx and/or DU-Rx/MT-Rx, the operation resource of the DU and the MT may be determined according to the Tx/Rx direction of the DU and the MT and the availability of the DU operation.

Based on H (hard)/S (soft)/NA (not available) attribute information of the DU configuration received by the IAB node (specifically IAB DU) and Availability Indicator (AI) information that the IAB node (specifically IAB MT) received through AI-DCI, the IAB node may determine operation resources of the DU and MT.

1) DU Hard Resources a) In the DU Hard resource, priority may be given to the operation of the DU. Accordingly, the DU can operate regardless of the Tx/Rx direction.

b) Whether the MT can operate may vary depending on a combination of the DUs Tx/Rx direction and its own Tx/Rx direction.

If the DU and the MT have the Tx/Rx direction combination set to TDM in the DU Hard resource, the MT does not operate.

On the other hand, when the DU and the MT have the Tx/Rx direction combination set to no-TDM in the DU Hard resource, the MT is operable.

However, in the resource in which the DU is set to be flexible in the DU Hard resource, the following operation may be performed.

Alt a. It may be assumed that the MT knows the Tx/Rx direction information actually applied by the DU in the flexible resource. When the DU and the MT have the Tx/Rx direction combination set to TDM based on the Tx/Rx direction information actually applied in the flexible resource for the DU, the MT does not operate. On the other hand, when the DU and the MT have the Tx/Rx direction combination set to no-TDM based on the Tx/Rx direction information actually applied in the flexible resource for the DU, the MT is operable. For example, assume that the MT knows that the DU actually performs D (downlink transmission) operation in a resource set as a flexible resource (a resource that can be used as either D (downlink transmission) or U (uplink reception)). If simultaneous operation (no-TDM) of Tx of DU and Tx of MT is allowed, the MT may also perform Tx (uplink transmission) operation on the resource.

In this case, in order for the DU of the parent node (hereinafter referred to as the parent DU) to transmit and receive only the operable resources of the MT of the IAB node (IAB MT), the IAB node may inform the parent node of resource direction information for the flexible resource of the DU of the IAB node (IAB DU). For example, resource direction information for the flexible resource of the IAB DU may be shared with the parent DU through the MAC CE or the like. Or, in order for the parent DU to perform transmission and reception only on the operable resource of the IAB MT, the IAB MT may share information on whether the IAB MT can operate in the flexible resource of the IAB DU.

Alt b. The IAB node may inform the parent node of whether the IAB MT operation is possible in the flexible resource of the IAB DU. In this case, if it is informed that the IAB MT is operable in the flexible resource of the IAB DU, the parent DU and the IAB MT may determine the corresponding resource as a resource in which the IAB MT is operable. In this case, the IAB DU sets/uses the resource direction of the child link to have the Tx/Rx direction in which the IAB DU and the IAB MT can perform no-TDM operation. On the other hand, if it is informed that the IAB MT is not operable in the flexible resource of the IAB DU, the parent DU and the IAB MT may determine the corresponding resource as a resource in which the IAB MT is not operable.

Alt c. It may not be assumed that the IAB MT knows the Tx/Rx direction information actually applied by the IAB DU in the flexible resource, or it may not be able to inform the parent node of the resource direction information in the flexible resource of the IAB DU. Considering this case, the IAB MT may not operate in a resource in which the IAB DU is set to be flexible among IAB DU Hard resources.

2) DU NA Resources a) In the DU NA resource, priority may be given to the operation of the MT. Therefore, the MT can operate regardless of the Tx/Rx direction.

b) Whether the DU can operate may vary depending on a combination of the MT's Tx/Rx direction and its own Tx/Rx direction.

If the DU and the MT have the Tx/Rx direction combination set to TDM in the DU NA resource, the DU does not operate.

On the other hand, when the DU and the MT have the Tx/Rx direction combination set to no-TDM in the DU NA resource, the DU is operable.

3) DU Soft Resource with AI Indication

In the DU soft resource indicated that the DU is usable by AI-DCI, priority may be given to the operation of the DU. Accordingly, in these resources, it is possible to determine the operation resources of the DU and MT as in the DU Hard resource.

4) DU Soft Resource without AI Indication

In a DU soft resource for which the DU is not indicated to be usable by AI-DCI, priority may be given to the operation of the MT. Accordingly, in such a resource, it is possible to determine the operation resource of the DU and the MT as in the DU NA resource.

Alternatively, in such a resource, the MT may determine its own operation resource as in the DU NA resource. In such a resource, the DU can be operated if 'the MT can operate by determining its own operation resource as in the DU NA resource'. Otherwise, the DU is inoperable.

B. Resources with Multiple Multiplexing Types

Figure 25:
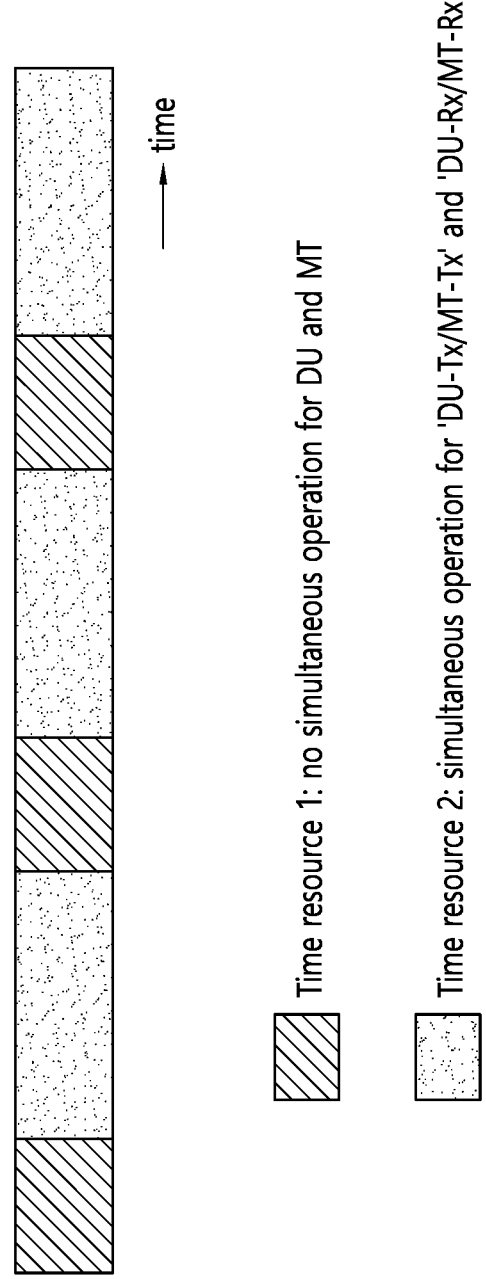
FIG. 25 shows an example of applying different multiplexing types in different time resources.

FIG. 25 shows an example of applying different multiplexing types in different time resources.

Referring to FIG. 25, from the perspective of a specific IAB node, a multiplexing type may vary according to a situation/time resource. For example, as shown in FIG. 25, a specific IAB node can operate as no-TDM for 'DU-Tx/MT-Tx' and 'DU-Rx/MT-Rx' in time resource 2, and TDM for the remaining combinations. That is, in time resource 2, simultaneous operations may be performed on 'DU-Tx/MT-Tx' and 'DU-Rx/MT-Rx'. In time resource 1, the IAB node operates in TDM for all Tx/Rx combinations. That is, in time resource 1, simultaneous operations cannot be performed for all Tx/Rx combinations.

At this time, for example, it may be considered that the multiplexing type of the IAB node varies depending on the situation/time resource, etc. for the following reasons.

Due to power sharing between the DU and the MT, depending on circumstances, the DU and the MT may not simultaneously perform transmission, and only the DU or MT may have to perform transmission.

Due to the interference problem that the MT and the DU have on each other's signals during simultaneous reception, depending on the situation, only the DU or the MT may have to perform reception.

When FD (full-duplex) operation between DU and MT, due to the interference problem of DU and MT with each other, depending on the situation, it may be necessary to perform a half-duplex (HD) operation in which the DU and the MT are transmitted in the Tx/Rx direction.

When the Tx/Rx timing of the DU/MT of the IAB node varies depending on the situation/time point, the simultaneous operation of the DU and the MT may vary depending on the Tx/Rx timing.

When it is determined that the multiplexing type related information of the IAB node is invalid or there is ambiguity, the default multiplexing type may be operated.

Hereinafter, a detailed method in which the multiplexing type of the IAB node is applied differently will be described.

1) Multiplexing types may be applied differently according to DU resource availability.

For example, in a resource set to Hard and/or NA by DU configuration, it is performed by a TDM operation for all Tx/Rx combinations of IAB node DU/MT. More specifically, only DU can perform Tx/Rx in a resource set to Hard, and only MT can perform Tx/Rx in a resource set to NA.

2) Multiplexing types may be applied differently according to time resources. That is, time resource 1 may operate as multiplexing type 1, but time resource 2 may operate as multiplexing type 2. Multiplexing type 1 and multiplexing type 2 may be independent/different multiplexing types.

For example, multiplexing type 1 may be a multiplexing type configured as no-TDM for at least one Tx/Rx combination. Multiplexing type 2 may be a multiplexing type configured as TDM for all Tx/Rx combinations. In this case, time resource 1 may operate as multiplexing type 1, and time resource 2 may operate as multiplexing type 2. This may be in order to operate as TDM, which is an operation of a legacy MT and a default operation of an IAB node in some time resources.

The multiplexing type 2 may be a multiplexing type configured as TDM for a Tx/Rx combination in which the Tx/Rx directions of the DU and the MT are different. That is, the multiplexing type 2 may be a multiplexing type that for DU-Tx/MT-Tx and DU-Rx/MT-Rx, it may be set to TDM and/or no-TDM, but for DU-Tx/MT-Rx and DU-Rx/MT-Tx, it may be set to TDM. In time resource 1, it operates as multiplexing type 1 set to no-TDM for some/all Tx/Rx combinations, and in time resource 2, it operates as multiplexing type 2 set to TDM for a Tx/Rx combination in which the Tx/Rx directions of the DU and the MT are different. This may be for dividing a resource capable of operating in full-duplex (FD) and a resource capable of operating only in half-duplex (HD) according to time resources.

The time resource information according to this multiplexing type may be set from a parent DU and/or CU/donor node through an RRC/MAC control element (CE) or the like.

3) The IAB node initially accesses the DU/cell and performs uplink transmission using the default multiplexing type until its multiplexing type-related information is set. Thereafter, when multiplexing type related information is set, transmission/reception can be performed using the multiplexing type. The default multiplexing type may be, for example, a multiplexing type set to TDM for all Tx/Rx combinations.

When the IAB node/IAB MT is in the RRC inactive and/or RRC idle state, it may determine that its multiplexing type is not valid and may perform transmission/reception by applying default multiplexing type information. When the IAB node/IAB MT switches from the RRC deactivated and/or RRC idle state to the RRC connected state, a) transmit/receive using the latest multiplexing type or b) transmission and reception can be performed by applying a default multiplexing type. Or, when the IAB node/IAB MT transitions from the RRC deactivated state to the RRC connected state, transmission and reception are performed using the latest multiplexing type, when switching from RRC idle state to RRC connected state, when a new multiplexing type is set while transmitting/receiving by applying a default multiplexing type, transmission/reception may be performed by applying the corresponding multiplexing type.

4) The multiplexing type applied may be different depending on the end of the channel/signal that the DU/MT of the IAB node needs to transmit/receive.

Figure 26:
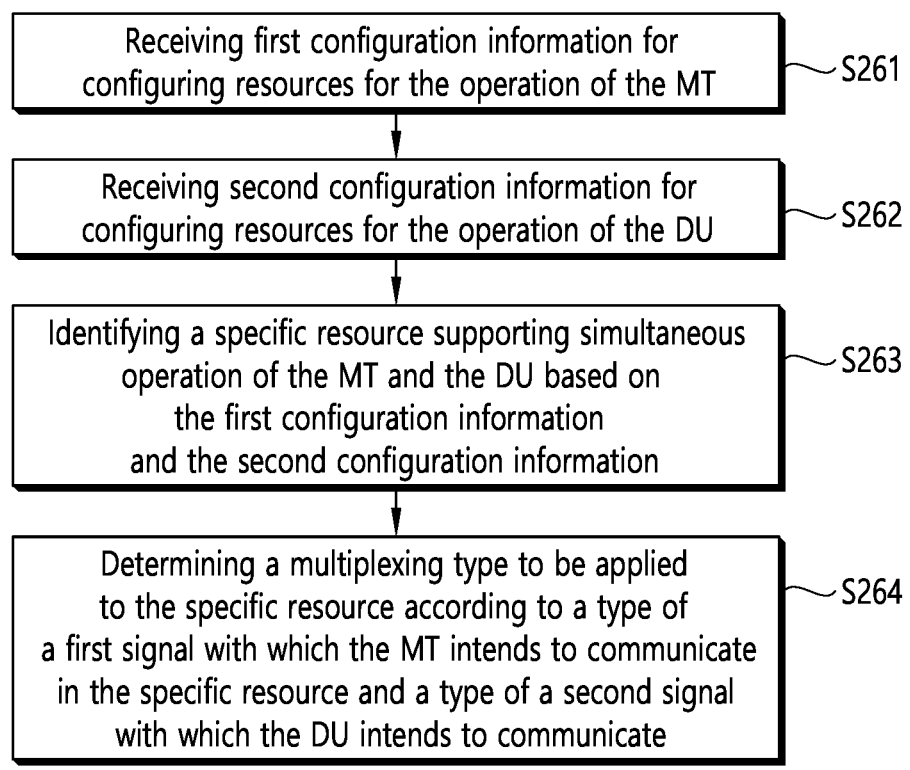
FIG. 26 illustrates an operation method of an IAB node including an MT and a DU in a wireless communication system.

FIG. 26 illustrates an operation method of an IAB node including an MT and a DU in a wireless communication system.

Referring to FIG. 26, the IAB node receives first configuration information for configuring resources for the operation of the MT (S261). For example, the MT may be provided with a slot format for at least one slot. The slot format includes a downlink symbol, an uplink symbol, and a flexible symbol. In addition, the MT may also receive a DCI format (DCI format 2_5) indicating whether the DU is available with a resource set as a soft resource for the DU. The first configuration information includes at least one of information indicating the slot format and the DCI format. The MT may separately receive information indicating the slot format and the DCI format. The MT may receive the first configuration information through a higher layer signal, a physical layer signal, and a combination of a higher layer signal and a physical layer signal. For example, the slot format may be received through a higher layer signal (including a method of receiving a list of slot formats through a higher layer signal and receiving a DCI format, which is a physical layer signal indicating any one slot format from the list), and DCI indicating availability of soft resources may be received through a physical layer signal.

The IAB node receives second configuration information for configuring resources for the operation of the DU (S262).

The DU may be provided with a slot format for at least one slot. In addition, the DU may receive information indicating attributes such as hard, soft, and unavailable for symbols in the slot. The second configuration information may include at least one of information indicating the slot format and information indicating an attribute. Information indicating the slot format and information indicating the attribute may be separately received.

The IAB node identifies a specific resource supporting simultaneous operation of the MT and the DU based on the first configuration information and the second configuration information (S263).

The IAB node determines a multiplexing type to be applied to the specific resource according to a type of a first signal with which the MT intends to communicate in the specific resource and a type of a second signal with which the DU intends to communicate (S264).

When a signal related to a physical random access channel (PRACH) transmitted by the MT or a sounding reference signal (SRS) is included as the type of the first signal, the multiplexing type to be applied to the specific resource is i) a first multiplexing type operating with time division multiplexing (TDM) for all transmission/reception combinations of the MT and the DU, or ii) a second multiplexing type operating with TDM for transmission of the MT.

Based on a synchronization signal or a channel state information reference signal (CSI-RS) received by the MT being included as the type of the first signal, the multiplexing type to be applied to the specific resource is i) a first multiplexing type operating with time division multiplexing (TDM) for all transmission/reception combinations of the MT and the DU, or ii) a third multiplexing type operating with TDM for reception of the MT.

Based on a synchronization signal or a channel state information reference signal (CSI-RS) transmitted by the DU being included as the type of the second signal, the multiplexing type to be applied to the specific resource is i) a first multiplexing type operating with time division multiplexing (TDM) for all transmission/reception combinations of the MT and the DU, or ii) a fourth multiplexing type operating with TDM for transmission of the DU.

Based on a signal related to a physical random access channel (PRACH) or a sounding reference signal (SRS) received by the DU being included as the type of the second signal, the multiplexing type to be applied to the specific resource is i) a first multiplexing type operating with time division multiplexing (TDM) for all transmission/reception combinations of the MT and the DU, or ii) a fifth multiplexing type operating with TDM for reception of the DU.

For example, in order for the IAB DU to transmit a specific channel/signal with high power, it may be applied a 'multiplexing type operating in TDM for all Tx/Rx combinations' or 'multiplexing type operating in TDM for DU-Tx' in the transmission resource of a specific channel/signal for the DU. Such a channel/signal may include, for example, an SSB/PBCH block (SSB) and a CSI-RS.

In order for the IAB MT to transmit a specific channel/signal with high power, it may be applied a 'multiplexing type operating in TDM for all Tx/Rx combinations' or 'multiplexing type operating in TDM for MT-Tx' in the transmission resource of a specific channel/signal for the MT. Such a channel/signal may include, for example, a physical random access channel (PRACH) and a sounding reference signal (SRS).

In order to reduce or eliminate interference from the signal transmitted by the MT when the IAB DU receives a specific channel/signal, the DU applies a 'multiplexing type operating in TDM for all Tx/Rx combinations' or a 'multiplexing type operating in TDM for DU-Rx' in the reception resource of the specific channel/signal. Such channels/signals may include, for example, PRACH and SRS.

In order to reduce or eliminate interference from the signal transmitted by the DU when the IAB MT receives a specific channel/signal, the MT applies a 'multiplexing type operating in TDM for all Tx/Rx combinations' or a 'multiplexing type operating with TDM in MT-Rx' in the reception resource of the specific channel/signal. Such a channel/signal may include, for example, an SSB/PBCH block and a CSI-RS.

A multiplexing type to be applied to the specific resource may be different from a multiplexing type to be applied to another resource located after the specific resource.

Figure 27:
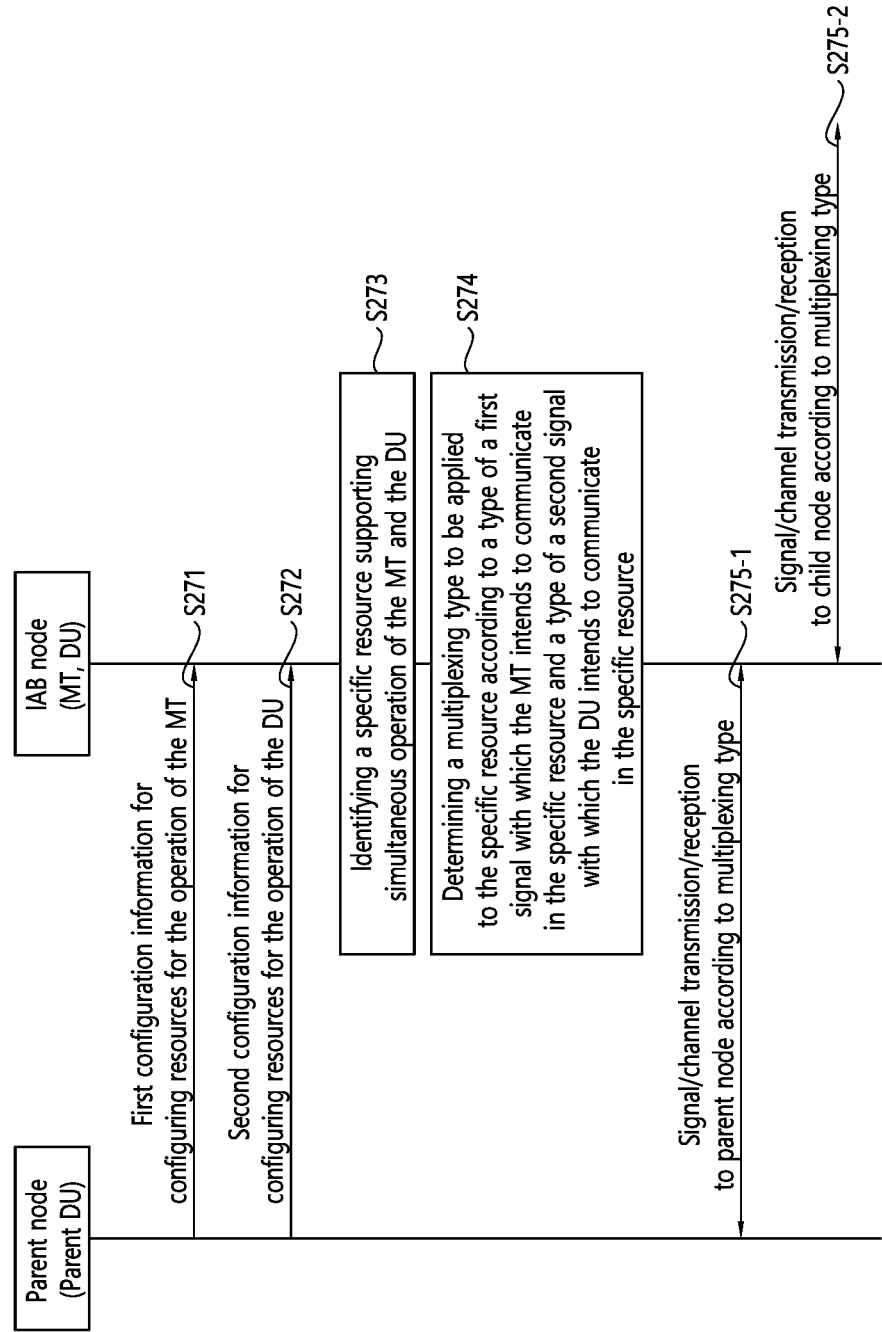
FIG. 27 illustrates an operation method between an IAB node including an MT and a DU and a parent node.

FIG. 27 illustrates an operation method between an IAB node including an MT and a DU and a parent node.

Referring to FIG. 27, the parent node transmits first configuration information for configuring resources for the operation of the MT to the IAB node (S271).

The parent node transmits second configuration information for configuring resources for the operation of the DU to the IAB node (S272).

The IAB node identifies a specific resource supporting simultaneous operation of the MT and the DU based on the first configuration information and the second configuration information (S273), a multiplexing type to be applied to the specific resource is determined according to a type of a first signal that the MT intends to communicate in the specific resource and a type of a second signal that the DU intends to communicate with (S274).

Even if the simultaneous operation is supported or the simultaneous operation is configured for the resource, the IAB node may perform the TDM operation according to the type of the first signal that the MT wants to communicate with and the type of the second signal that the DU wants to communicate with. For example, an operation in which the MT transmits a signal to the parent node (S275-1) and an operation in which the DU transmits a signal to the child node (S275-2) may be performed at different times.

Alternatively, in a resource that supports (or is configured with) simultaneous operation, a no-TDM operation may be performed according to the type of the first signal that the MT wants to communicate with and the type of the second signal that the DU wants to communicate with. That is, simultaneous operations may be performed. That is, the operation S275-1 and the operation S275-2 may be simultaneously performed.

Figure 28:
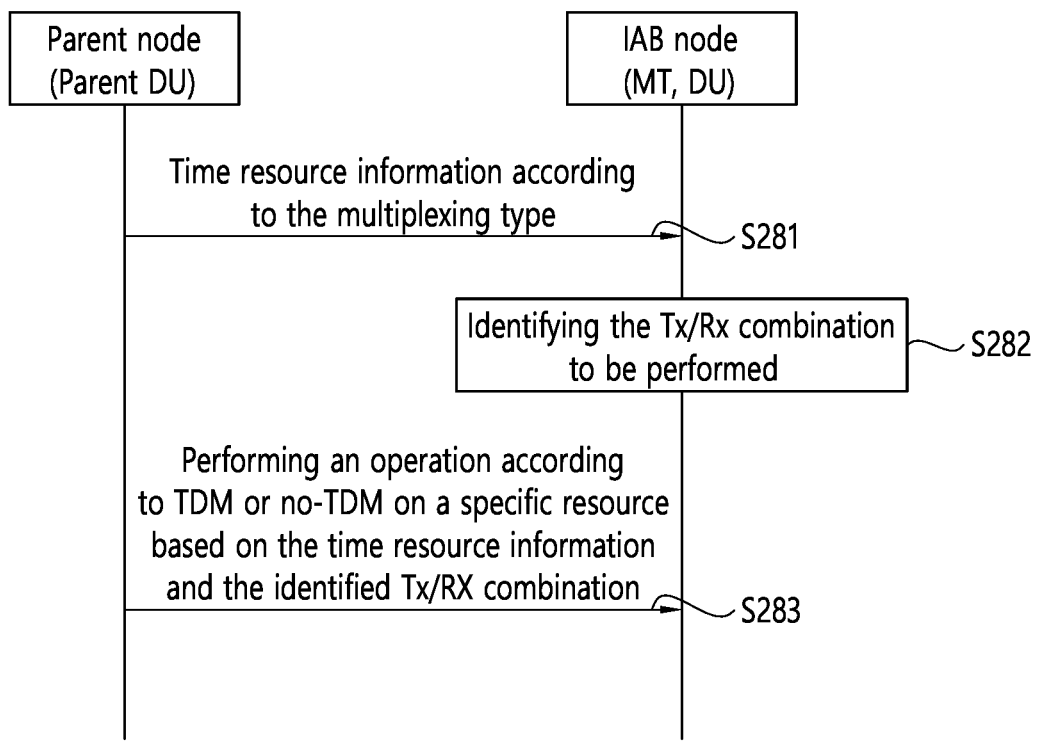
FIG. 28 illustrates another operation method between an IAB node including an MT and a DU and a parent node.

FIG. 28 illustrates another operation method between an IAB node including an MT and a DU and a parent node.

Referring to FIG. 28, the parent node provides time resource information according to the multiplexing type to the IAB node (S281). For example, time resource information for allocating/notifying/setting time resource 1 to which multiplexing type 1 is applied and time resource 2 to which multiplexing type 2 is applied may be provided. Multiplexing type 1 may be, for example, a multiplexing type configured as no-TDM for at least one Tx/Rx combination. Multiplexing type 2 may be a multiplexing type configured as TDM for all Tx/Rx combinations.

The IAB node identifies the Tx/Rx combination to be performed (S282), an operation according to TDM or no- TDM is performed on a specific resource based on the time resource information and the identified Tx/RX combination (S283).

5) The multiplexing type applied may be different depending on the Tx/Rx timing applied by the IAB node.

In the case of an IAB node capable of simultaneous operation between the DU and the MT when the timing of the DU and the MT in the IAB node is aligned, if the DU and MT have Tx/Rx timing aligned, a multiplexing type that allows simultaneous operation is applied and if the DU and the MT have misaligned Tx/Rx timing, a multiplexing type that does not allow simultaneous operation may be applied. For example, in a time resource in which Tx timings of DU and MT are aligned, a multiplexing type that performs no-TDM for DU-Tx/MT-Tx is applied, in a time resource in which the Tx timings of DU and MT are not aligned, a multiplexing type for performing TDM for DU-Tx/MT-Tx may be applied.

Figure 29:
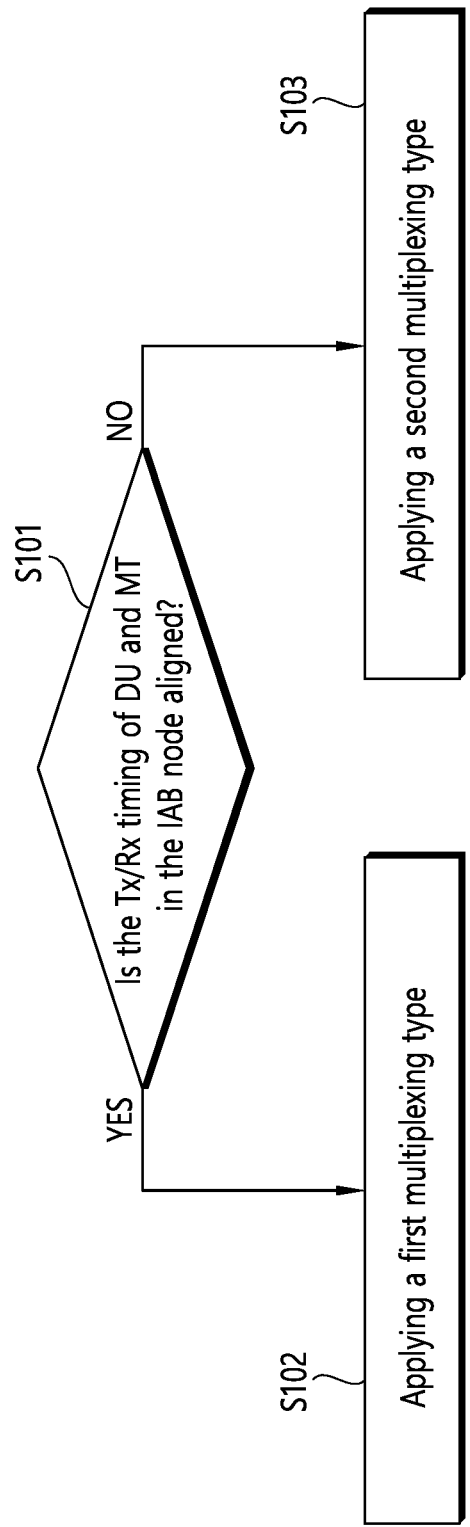
FIG. 29 shows an example of applying different multiplexing types according to Tx/Rx timing applied by the IAB node.

FIG. 29 shows an example of applying different multiplexing types according to Tx/Rx timing applied by the IAB node.

Referring to FIG. 29, the IAB node determines whether the Tx/Rx timing of the DU and the MT for a specific resource is aligned (S101), a first multiplexing type (e.g., a multiplexing type that allows simultaneous operation between DU and MT) is applied to the aligned resources (S102), a second multiplexing type (e.g., a multiplexing type that does not allow simultaneous operation between DUs and MTs) may be applied to unaligned resources (S103).

In the above description, the parent node may be replaced with a donor node or a centralized unit (CU). A child node may be replaced by a UE.

Figure 30:
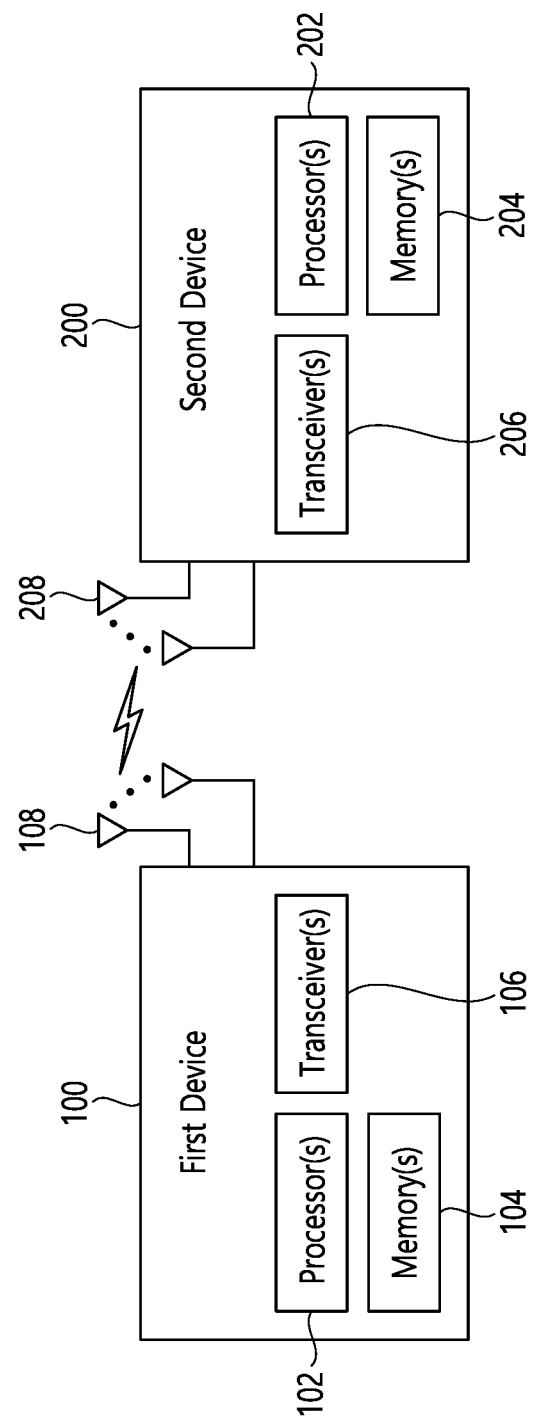
FIG. 30 illustrates an example of a wireless communication device for implementing the present disclosure.

FIG. 30 illustrates a wireless device applicable to the present specification.

Referring to FIG. 30, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

That is, at least one computer readable medium (CRM) having an instruction to be executed by at least one processor to perform operations includes, a step of receiving first configuration information for configuring a resource for an operation of the MT, receiving second configuration information for configuring a resource for an operation of the DU and identifying a specific resource supporting simultaneous operation of the MT and the DU based on the first configuration information and the second configuration information, and determining a multiplexing type to be applied to the specific resource according to a type of a first signal that the MT intends to communicate in the specific resource and a type of a second signal that the DU intends to communicate in the specific resource.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 31:
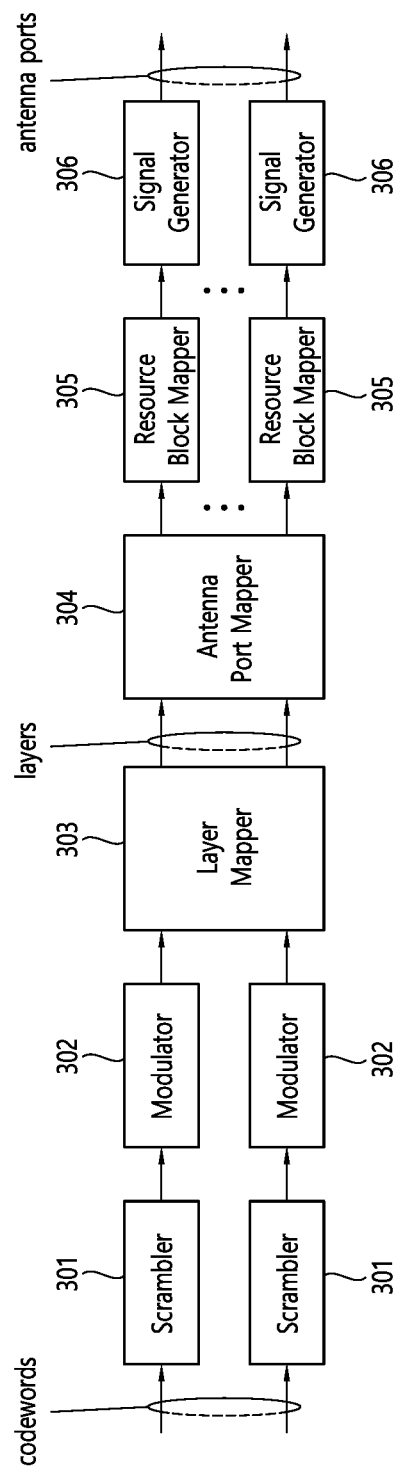
FIG. 31 shows an example of the structure of a signal processing module.

FIG. 31 shows an example of a structure of a signal processing module. Herein, signal processing may be performed in the processors 102 and 202 of FIG. 30.

Referring to FIG. 31, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 32:
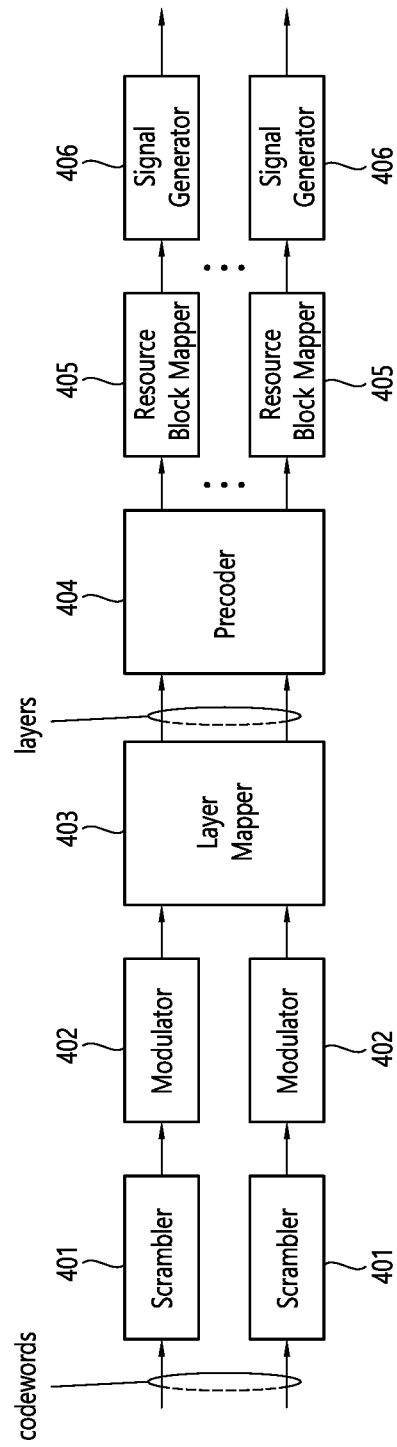
FIG. 32 shows another example of the structure of a signal processing module in a transmission device.

FIG. 32 shows another example of a structure of a signal processing module in a transmitting device. Herein, signal processing may be performed in a processor of a UE/BS, such as the processors 102 and 202 of FIG. 30.

Referring to FIG. 32, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 33:
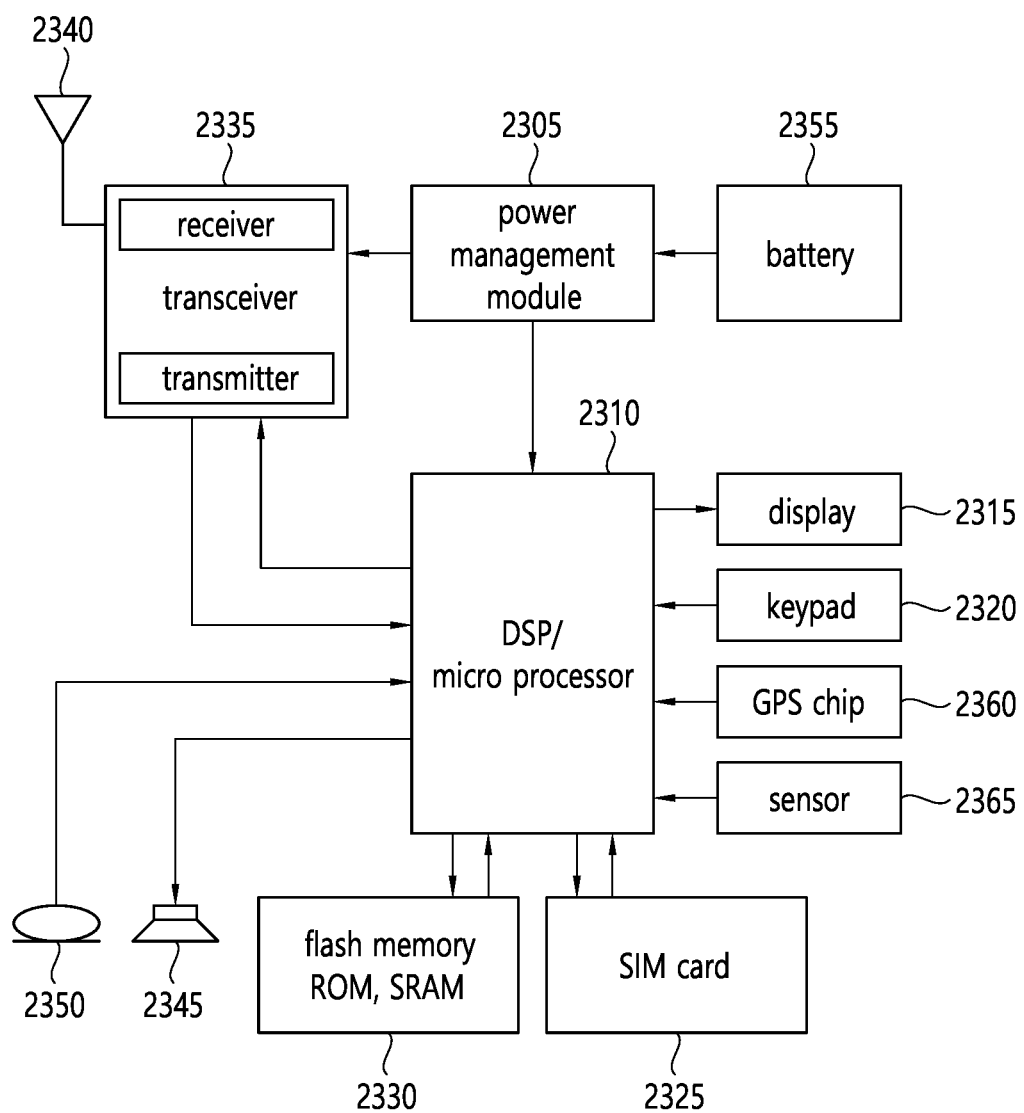
FIG. 33 illustrates an example of a wireless communication device according to an embodiment of the present disclosure.

FIG. 33 illustrates an example of a wireless communication device according to an implementation example of the present disclosure.

Referring to FIG. 33, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 33 may be the processors 102 and 202 in FIG. 30.

The memory 2330 is connected to the processor 2310 and stores information related to operations of the processor. The memory may be located inside or outside the processor and connected to the processor through various techniques such as wired connection and wireless connection. The memory 2330 in FIG. 33 may be the memories 104 and 204 in FIG. 30.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions.

In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 33 may be the transceivers 106 and 206 in FIG. 30.

Although not shown in FIG. 33, various components such as a camera and a universal serial bus (USB) port may be additionally included in the UE. For example, the camera may be connected to the processor 2310.

FIG. 33 is an example of implementation with respect to the UE and implementation examples of the present disclosure are not limited thereto. The UE need not essentially include all the components shown in FIG. 33. That is, some of the components, for example, the keypad 2320, the GPS chip 2360, the sensor 2365 and the SIM card 2325 may not be essential components. In this case, they may not be included in the UE.

Figure 34:
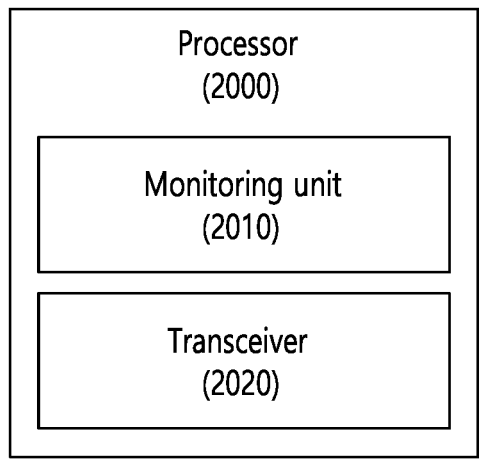
FIG. 34 shows an example of a processor 2000.

FIG. 34 shows an example of a processor 2000.

Referring to FIG. 34, the processor 2000 may include a monitoring unit 2010 and a transceiver 2020. The processor 2000 may execute the methods described in FIG. 22 to FIG. 28. For example, the processor 2000 receives first configuration information for configuring a resource for an operation of the MT by a monitoring, receives second configuration information for configuring a resource for an operation of the DU. And the processor 2000 identifies a specific resource supporting simultaneous operation of the MT and the DU based on the first configuration information and the second configuration information. And then, the processor 2000 determines a multiplexing type to be applied to the specific resource according to a type of a first signal that the MT intends to communicate in the specific resource and a type of a second signal that the DU intends to communicate in the specific resource. The processor 2000 may be an example of the processors 102 and 202 of FIG. 30.

Figure 35:
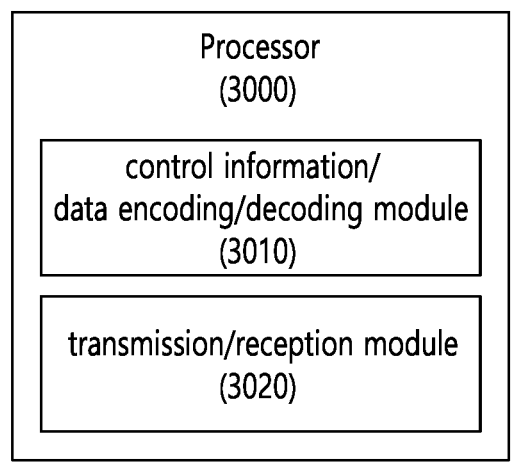
FIG. 35 shows an example of a processor 3000.

FIG. 35 shows an example of a processor 3000.

Referring to FIG. 35, the processor 3000 may include a control information/data encoding/decoding module 3010 and a transmission/reception module 3020. The processor 3000 may execute the methods described in FIG. 22 to FIG. 28. For example, the processor 3000 transmits, to the IAB node, first configuration information for configuring a resource for an operation of the MT, transmits, to the IAB node, second configuration information for configuring a resource for an operation of the DU. And then, the processor 3000 communicates with the IAB node in a specific resource supporting simultaneous operation of the MT and the DU based on the first configuration information and the second configuration information. Here, a multiplexing type applied to the specific resource is determined according to a type of a first signal that the MT intends to communicate in the specific resource and a type of a second signal that the DU intends to communicate in the specific resource. The processor 3000 may be an example of the processors 102 and 202 of FIG. 30.

Figure 36:
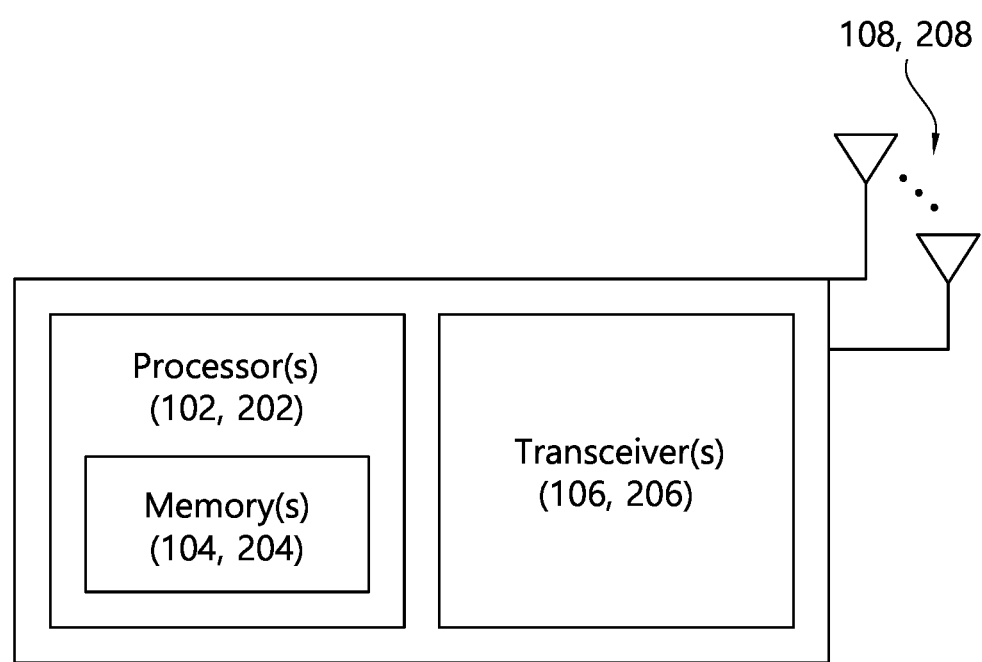
FIG. 36 shows another example of a wireless device.

FIG. 36 shows another example of a wireless device.

Referring to FIG. 36, the wireless device may include one or more processors 102 and 202, one or more memories 104 and 204, and one or more transceivers 108 and 208.

The example of the wireless device described in FIG. 36 is different from the example of the wireless described in FIG. 30 in that the processors 102 and 202 and the memories 104 and 204 are separated in FIG. 30 whereas the memories 104 and 204 are included in the processors 102 and 202 in the example of FIG. 36. That is, the processor and the memory may constitute one chipset.

Figure 37:
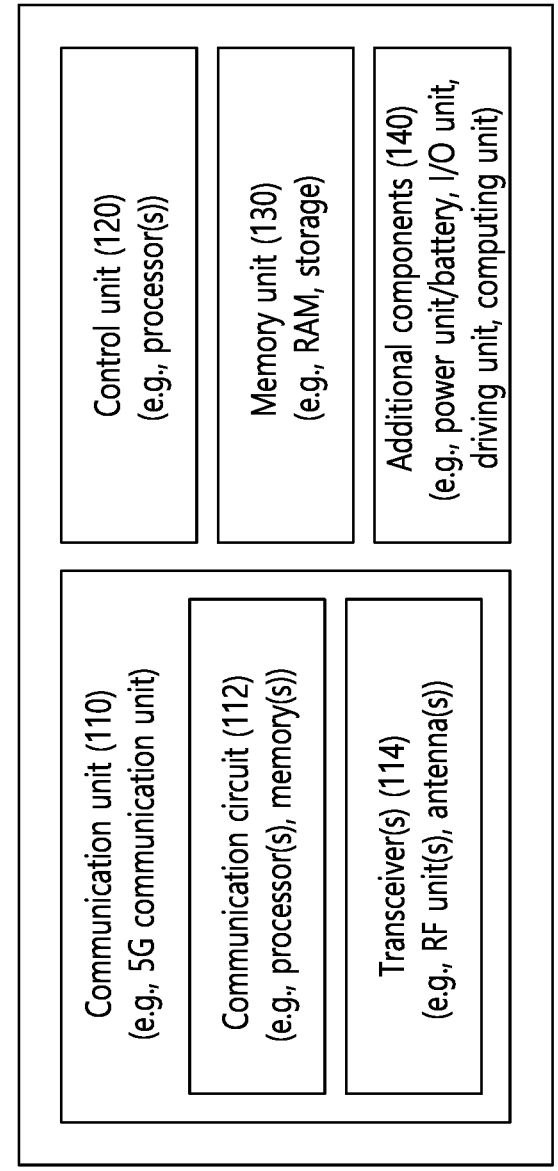
FIG. 37 shows another example of a wireless device applied to the present specification.

FIG. 37 shows another example of a wireless device applied to the present specification. The wireless device may be implemented in various forms according to a use-case/service.

Referring to FIG. 37, wireless devices 100 and 200 may correspond to the wireless devices 100 and 200 of FIG. 36 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 36. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 39), the vehicles (100b-1 and 100b-2 of FIG. 39), the XR device (100c of FIG. 39), the hand-held device (100d of FIG. 39), the home appliance (100e of FIG. 39), the IoT device (100f of FIG. 39), a digital broadcast UE, a hologram device, a public safety device, an MTC device, a medicine device, a fintech device (or a finance device), a security device, a climate/environment device, the AI server/device (400 of FIG. 39), the BSs (200 of FIG. 39), a network node, etc. The wireless device may be used in a mobile or fixed place according to a use-example/service.

In FIG. 37, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 38:
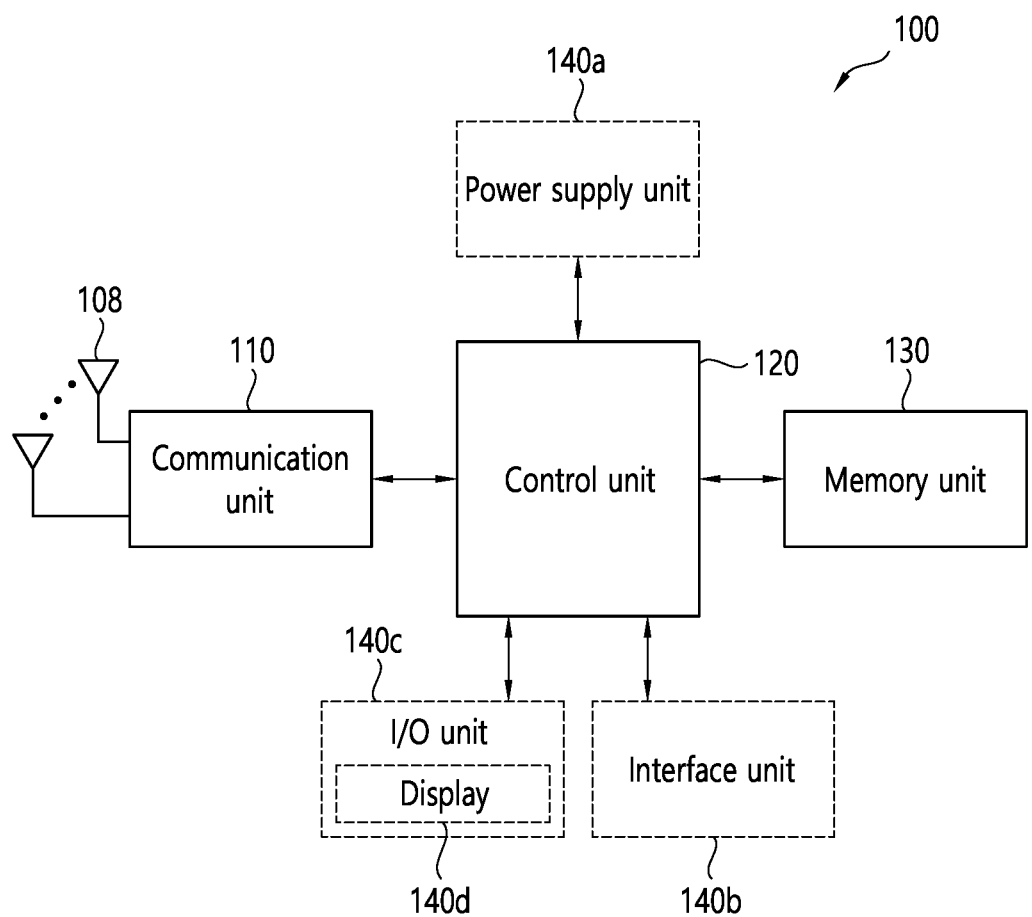
FIG. 38 illustrates a hand-held device applied to the present specification.

FIG. 38 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 38, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 37.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 39:
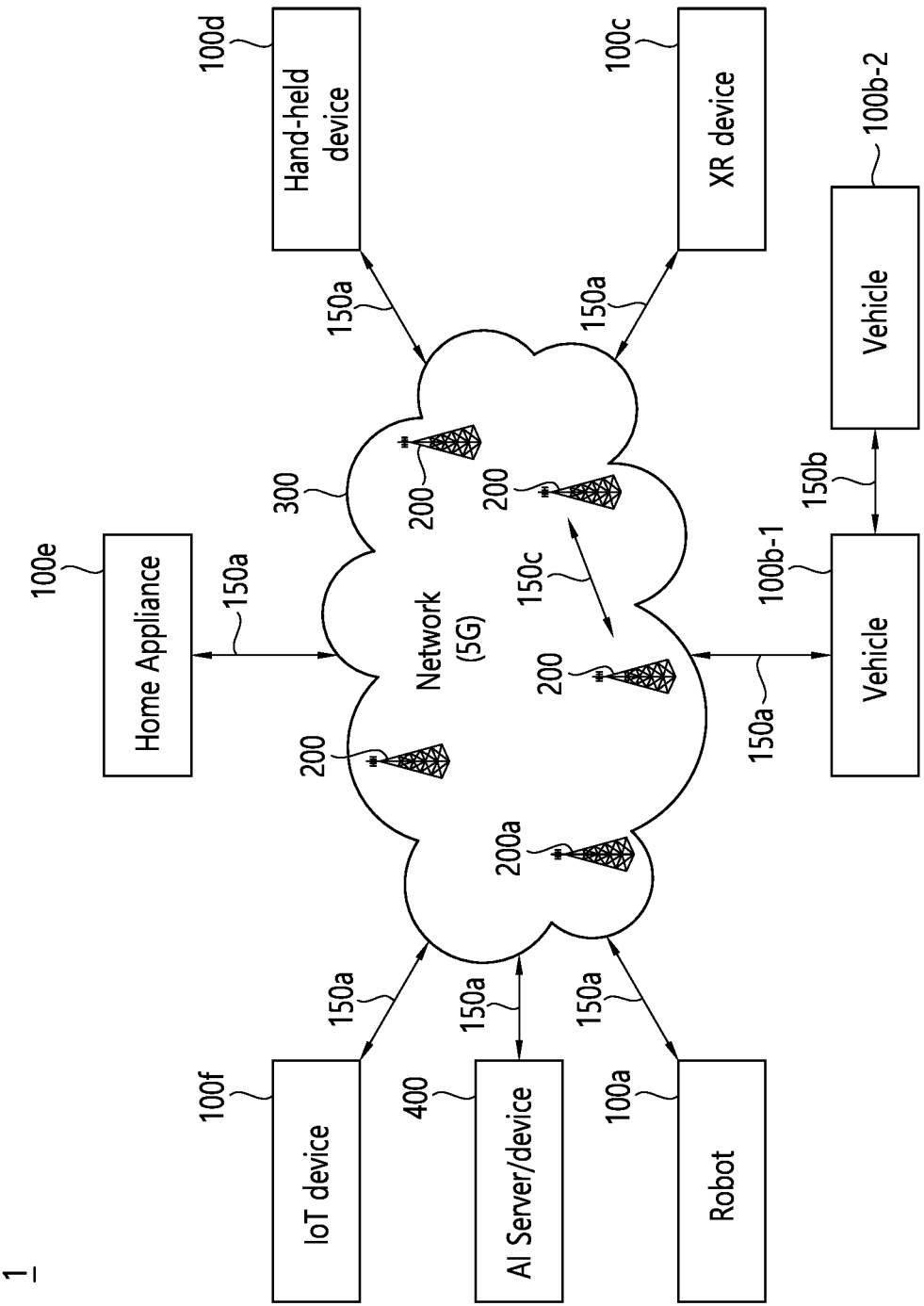
FIG. 39 illustrates a communication system 1 applied to the present specification.

FIG. 39 illustrates a communication system 1 applied to the present specification.

Referring to FIG. 39, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 5. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 5

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 6 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 6

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 40:
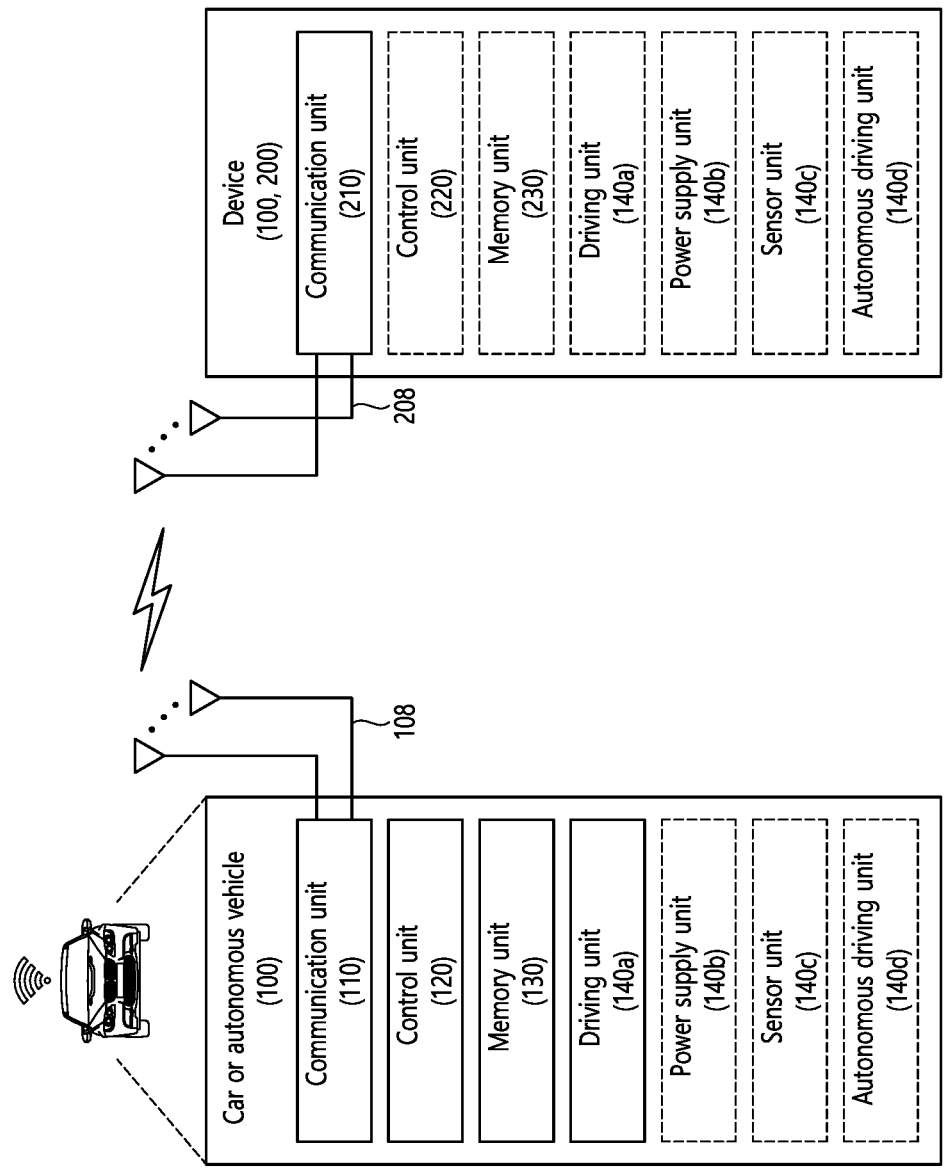
FIG. 40 illustrates a vehicle or an autonomous vehicle applicable to the present specification.

FIG. 40 illustrates a vehicle or an autonomous vehicle applicable to the present specification. The vehicle or autonomous vehicle may be implemented by a mobile robot, a car, a train, a manned/unmanned Aerial Vehicle (AV), a ship, etc.

Referring to FIG. 40, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d respectively correspond to the blocks 110/130/140 of FIG. 37.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method, comprising:
    receiving, by an integrated access and backhaul (IAB) node including a distributed unit (DU) and a mobile terminal (MT), first configuration information for configuring a resource for an operation of the MT;
    receiving, by the IAB node, second configuration information for configuring a resource for an operation of the DU; and
    identifying, by the IAB node, a specific resource supporting simultaneous operation of the MT and the DU based on the first configuration information and the second configuration information, wherein based on a type of a first signal that the MT intends to communicate in the specific resource and a type of a second signal that the DU intends to communicate in the specific resource, a multiplexing type to be applied to the specific resource is determined, wherein based on a signal related to a physical random access channel (PRACH) transmitted by the MT or a sounding reference signal (SRS) being included as the type of the first signal, the multiplexing type to be applied to the specific resource is i) a first multiplexing type operating with time division multiplexing (TDM) for all transmission/reception combinations of the MT and the DU or ii) a second multiplexing type operating with TDM for transmission of the MT, wherein based on a synchronization signal or a channel state information reference signal (CSI-RS) received by the MT being included as the type of the first signal, the multiplexing type to be applied to the specific resource is i) the first multiplexing type or ii) a third multiplexing type operating with TDM for reception of the MT; and wherein a multiplexing type to be applied to the specific resource and a multiplexing type to be applied to another resource located after the specific resource are different from each other.

2. An integrated access and backhaul (IAB) node including a distributed unit (DU) and a mobile terminal (MT), the IAB node comprising:

at least one transceiver;

at least one memory; and at least one processor operatively coupled with the at least one memory and the at least one transceiver, wherein the at least one memory stores instructions that, based on being executed by the at least one processor, cause the at least one processor to perform operations comprising:

receiving first configuration information for configuring a resource for an operation of the MT;

receiving second configuration information for configuring a resource for an operation of the DU; and identifying a specific resource supporting simultaneous operation of the MT and the DU based on the first configuration information and the second configuration information, wherein based on a type of a first signal that the MT intends to communicate in the specific resource and a type of a second signal that the DU intends to communicate in the specific resource, a multiplexing type to be applied to the specific resource is determined, wherein based on a signal related to a physical random access channel (PRACH) transmitted by the MT or a sounding reference signal (SRS) being included as the type of the first signal, the multiplexing type to be applied to the specific resource is i) a first multiplexing type operating with time division multiplexing (TDM) for all transmission/reception combinations of the MT and the DU or ii) a second multiplexing type operating with TDM for transmission of the MT, wherein based on a synchronization signal or a channel state information reference signal (CSI-RS) received by the MT being included as the type of the first signal, the multiplexing type to be applied to the specific resource is i) the first multiplexing type or ii) a third multiplexing type operating with TDM for reception of the MT, and wherein a multiplexing type to be applied to the specific resource and a multiplexing type to be applied to another resource located after the specific resource are different from each other.

3. A method, comprising:

transmitting, by a parent node to an integrated access and backhaul (IAB) node including a distributed unit (DU) and a mobile terminal (MT), first configuration information for configuring a resource for an operation of the MT;

transmitting, by the parent node to the IAB node, second configuration information for configuring a resource for an operation of the DU; and communicating, by the parent node, with the IAB node in a specific resource supporting simultaneous operation of the MT and the DU based on the first configuration information and the second configuration information, wherein a multiplexing type applied to the specific resource is determined based on a type of a first signal that the MT intends to communicate in the specific resource and a type of a second signal that the DU intends to communicate in the specific resource, wherein based on a signal related to a physical random access channel (PRACH) transmitted by the MT or a sounding reference signal (SRS) being included as the type of the first signal, the multiplexing type to be applied to the specific resource is i) a first multiplexing type operating with time division multiplexing (TDM) for all transmission/reception combinations of the MT and the DU or ii) a second multiplexing type operating with TDM for transmission of the MT, wherein based on a synchronization signal or a channel state information reference signal (CSI-RS) received by the MT being included as the type of the first signal, the multiplexing type to be applied to the specific resource is i) the first multiplexing type or ii) a third multiplexing type operating with TDM for reception of the MT, and wherein a multiplexing type to be applied to the specific resource and a multiplexing type to be applied to another resource located after the specific resource are different from each other.

* * * * *